US008816956B2

(12) United States Patent  
Ludwig

(10) Patent No.: US 8,816,956 B2  
(45) Date of Patent: Aug. 26, 2014

(54) MOUSE-BASED USER INTERFACE DEVICE EMPLOYING USER-REMOVABLE MODULES

(75) Inventor: Lester F. Ludwig, Redwood Shores, CA (US)

(73) Assignee: BioRam Tech L.L.C., Dover, DE (US)

( * ) Notice: Subject to any disclaimer, the term of this patent is extended or adjusted under 35 U.S.C. 154(b) by 1991 days.

(21) Appl. No.: 11/008,892

(22) Filed: Dec. 10, 2004

(65) Prior Publication Data

US 2005/0179652 A1  Aug. 18, 2005

Related U.S. Application Data

(63) Continuation-in-part of application No. 10/806,694, filed on Mar. 22, 2004, now abandoned, which is a continuation of application No. 10/779,368, filed on Feb. 13, 2004, now Pat. No. 7,620,915.

(51) Int. Cl.
*G09G 5/00* (2006.01)
*G06F 3/038* (2013.01)
*G06F 3/0354* (2013.01)
*G06F 3/0484* (2013.01)
*G06F 3/0481* (2013.01)
*G06F 3/0346* (2013.01)

(52) U.S. Cl.
CPC ............ *G06F 3/04847* (2013.01); *G06F 3/038* (2013.01); *G06F 3/03547* (2013.01); *G06F 3/03543* (2013.01); *G06F 3/04815* (2013.01); *G06F 3/0346* (2013.01); *G06F 3/04845* (2013.01)
USPC ............................ 345/156; 345/157; 345/158

(58) Field of Classification Search
USPC .................................................. 345/163–167
See application file for complete search history.

(56) References Cited

U.S. PATENT DOCUMENTS

| 3,974,493 A | 8/1976 | De Cavaignac et al. |
| 4,988,981 A | 1/1991 | Zimmerman et al. |
| 5,049,863 A | 9/1991 | Oka |
| 5,095,303 A | 3/1992 | Clark |
| 5,327,161 A | 7/1994 | Logan |

(Continued)

OTHER PUBLICATIONS

English, William K., Engelbart, Douglas C. and Berman, Melvyn L., Display-Selection Techniques for Text Manipulation, IEEE Transactions on Human Factors in Electronics, p. 5-15, vol. HFE-8, No. 1, Mar. 1967.

(Continued)

*Primary Examiner* — Jesus Hernandez
(74) *Attorney, Agent, or Firm* — Christensen O'Connor Johnson Kindness PLLC

(57) ABSTRACT

The functionality of a conventional mouse is extended to provide an extended number of simultaneously adjustable user interface parameters employing one or more user-removable modules. In an embodiment, a user interface for controlling an external device, such as a computer, includes a first user interface sensor configured with a housing. This first sensor generates a first plurality of signals responsive to movement of the housing relative to two orthogonal axes. A compartment is configured with the housing and is sized to receive the user-removable module. This user-removable module contains a second user interface sensor, which generates a second plurality of signals responsive to user manipulation. Output is provided responsive to signals generated by the first and second user interface sensors. In another embodiment, the housing of an extended functionality mouse itself serves as a module removable from a compartment provided in another physical device.

1 Claim, 23 Drawing Sheets

(56) References Cited

U.S. PATENT DOCUMENTS

| | | | |
|---|---|---|---|
| 5,490,039 A | 2/1996 | Helms | |
| 5,565,891 A | 10/1996 | Armstrong | |
| 5,586,243 A | 12/1996 | Barber | |
| 5,615,083 A * | 3/1997 | Burnett | 361/686 |
| 5,666,499 A | 9/1997 | Baudel | |
| 5,670,990 A | 9/1997 | Bidiville | |
| 5,726,684 A | 3/1998 | Blankenship et al. | |
| 5,805,144 A | 9/1998 | Scholder | |
| 5,852,442 A | 12/1998 | Morito | |
| 5,881,366 A | 3/1999 | Bodenmann | |
| 5,917,472 A | 6/1999 | Perälä | |
| 5,999,169 A | 12/1999 | Lee | |
| 6,057,830 A | 5/2000 | Chan | |
| 6,061,051 A | 5/2000 | Chan | |
| 6,128,006 A | 10/2000 | Rosenberg | |
| 6,204,837 B1 | 3/2001 | Smith | |
| 6,205,021 B1 | 3/2001 | Klein et al. | |
| 6,219,037 B1 * | 4/2001 | Lee | 345/167 |
| 6,232,958 B1 | 5/2001 | Casebolt | |
| 6,239,790 B1 | 5/2001 | Martinelli | |
| 6,239,803 B1 | 5/2001 | Driskell | |
| 6,281,881 B1 | 8/2001 | Siddiqui | |
| 6,295,051 B1 | 9/2001 | Kanevsky | |
| 6,323,846 B1 | 11/2001 | Westerman | |
| 6,329,978 B1 | 12/2001 | Yeh | |
| 6,396,477 B1 | 5/2002 | Hinckley | |
| 6,424,335 B1 | 7/2002 | Kim et al. | |
| 6,456,275 B1 | 9/2002 | Hinckley | |
| 6,489,948 B1 | 12/2002 | Lau | |
| 6,525,713 B1 | 2/2003 | Soeta et al. | |
| 6,556,150 B1 | 4/2003 | McLoone | |
| 6,570,078 B2 | 5/2003 | Ludwig | |
| 6,570,557 B1 | 5/2003 | Westerman | |
| 6,580,420 B1 | 6/2003 | Wang | |
| 6,587,091 B2 | 7/2003 | Serpa | |
| 6,590,564 B1 | 7/2003 | McLoone | |
| 6,623,194 B1 | 9/2003 | Lip | |
| 6,646,632 B2 | 11/2003 | Wegmuller | |
| 6,677,932 B1 | 1/2004 | Westerman | |
| 6,704,003 B2 * | 3/2004 | Tiphane et al. | 345/163 |
| 6,714,221 B1 | 3/2004 | Christie | |
| 6,888,536 B2 | 5/2005 | Westerman | |
| 6,909,422 B2 | 6/2005 | Yokoji | |
| 7,168,047 B1 | 1/2007 | Huppi | |
| 7,256,770 B2 | 8/2007 | Hinckley | |
| 7,358,956 B2 | 4/2008 | Hinckley | |
| 7,463,239 B2 | 12/2008 | Ledbetter | |
| 7,557,797 B2 | 7/2009 | Ludwig | |
| 7,620,915 B2 | 11/2009 | Ludwig | |
| 7,808,479 B1 | 10/2010 | Hotelling | |
| 2001/0033268 A1 | 10/2001 | Jiang | |
| 2002/0005108 A1 | 1/2002 | Ludwig | |
| 2002/0021289 A1 | 2/2002 | Combs | |
| 2002/0080112 A1 | 6/2002 | Braun | |
| 2002/0084981 A1 | 7/2002 | Flack | |
| 2002/0113776 A1 | 8/2002 | Meriaz | |
| 2002/0190930 A1 | 12/2002 | Shiizaki | |
| 2003/0006961 A1 | 1/2003 | Shipilevsky | |
| 2003/0063062 A1 | 4/2003 | Tsumura | |
| 2003/0107552 A1 | 6/2003 | Lu | |
| 2003/0107603 A1 | 6/2003 | Clapper | |
| 2003/0169216 A1 | 9/2003 | Chung | |
| 2004/0017358 A1 | 1/2004 | Kuo | |
| 2004/0126171 A1 | 7/2004 | McLoone | |
| 2004/0147318 A1 | 7/2004 | Shahoian | |
| 2004/0155865 A1 | 8/2004 | Swiader | |
| 2004/0189605 A1 | 9/2004 | Shih | |
| 2005/0179650 A1 | 8/2005 | Ludwig | |
| 2005/0179652 A1 | 8/2005 | Ludwig | |
| 2005/0179655 A1 | 8/2005 | Ludwig | |
| 2005/0179663 A1 | 8/2005 | Ludwig | |
| 2005/0193321 A1 | 9/2005 | Iwema | |
| 2005/0275637 A1 | 12/2005 | Hinckley | |
| 2006/0125803 A1 | 6/2006 | Westerman | |
| 2008/0088602 A1 | 4/2008 | Hotelling | |
| 2008/0128182 A1 | 6/2008 | Westerman | |
| 2008/0158169 A1 | 7/2008 | O'Connor | |
| 2008/0163130 A1 | 7/2008 | Westerman | |
| 2008/0165140 A1 | 7/2008 | Christie | |
| 2008/0165141 A1 | 7/2008 | Christie | |
| 2008/0168364 A1 | 7/2008 | Miller | |
| 2008/0204426 A1 | 8/2008 | Hotelling | |
| 2008/0211775 A1 | 9/2008 | Hotelling | |
| 2008/0211783 A1 | 9/2008 | Hotelling | |
| 2008/0211784 A1 | 9/2008 | Hotelling | |
| 2008/0211785 A1 | 9/2008 | Hotelling | |
| 2008/0231610 A1 | 9/2008 | Hotelling | |
| 2008/0309632 A1 | 12/2008 | Westerman | |
| 2010/0156818 A1 | 6/2010 | Burrough | |
| 2010/0214250 A1 | 8/2010 | Gillespie | |

OTHER PUBLICATIONS

"Intuos2," Wacom Technology, Corp., Vancouver, Washington, Jan. 2004.

"Logitech MX 310 Optical Mouse," Logitech, Inc., Fremont, California, Jan. 2004.

"Synaptics Targets Vision, Sound processing," Symantec, Springfield, Oregon, Oct. 31, 1994.

"The Spaceball 3D Controller," 3Dconnection, Germany, Jan. 2004.

White, R., "How Computers Work," 6th ed., Que Corporation, Indianapolis, Ind., 2002, pp. 224-226.

Office Action dated Apr. 27, 2007, in U.S. Appl. No. 10/997,097, filed Nov. 24, 2004, 18 pages.

Final Office Action dated Dec. 27, 2007, in U.S. Appl. No. 10/997,097, filed Nov. 24, 2004, 15 pages.

Office Action dated Dec. 31, 2008, in U.S. Appl. No. 10/997,097, filed Nov. 24, 2004, 16 pages.

Final Office Action dated Jul. 22, 2009, in U.S. Appl. No. 10/997,097, filed Nov. 24, 2004, 12 pages.

Decision on Appeal dated Sep. 30, 2013, in U.S. Appl. No. 10/997,097, filed Nov. 24, 2004, 11 pages.

Office Action dated Oct. 31, 2007, in U.S. Appl. No. 10/806,694, filed Mar. 22, 2004, 12 pages.

Final Office Action dated May 20, 2008, in U.S. Appl. No. 10/806,694, filed Mar. 22, 2004, 11 pages.

Advisory Action dated Aug. 29, 2008, in U.S. Appl. No. 10/806,694, filed Mar. 22, 2004, 4 pages.

Office Action dated Jan. 7, 2009, in U.S. Appl. No. 10/806,694, filed Mar. 22, 2004, 11 pages.

Final Office Action dated Jul. 17, 2009, in U.S. Appl. No. 10/806,694, filed Mar. 22, 2004, 13 pages.

Office Action dated Mar. 4, 2010, in U.S. Appl. No. 10/806,694, filed Mar. 22, 2004, 14 pages.

Final Office Action dated Sep. 9, 2010, in U.S. Appl. No. 10/806,694, filed Mar. 22, 2004, 11 pages.

Office Action dated Jul. 11, 2011, in U.S. Appl. No. 10/806,694, filed Mar. 22, 2004, 12 pages.

Final Office Action dated Feb. 27, 2012, in U.S. Appl. No. 10/806,694, filed Mar. 22, 2004, 23 pages.

Office Action dated Feb. 7, 2007, in U.S. Appl. No. 10/779,368, filed Feb. 13, 2004, 24 pages.

Final Office Action dated Oct. 1, 2007, in U.S. Appl. No. 10/779,368, filed Feb. 13, 2004, 22 pages.

Advisory Action dated Mar. 25, 2008, in U.S. Appl. No. 10/779,368, filed Feb. 13, 2004, 4 pages.

Office Action dated Jun. 5, 2008, in U.S. Appl. No. 10/779,368, filed Feb. 13, 2004, 24 pages.

Final Office Action dated Dec. 5, 2008, in U.S. Appl. No. 10/779,368, filed Feb. 13, 2004, 26 pages.

Office Action dated Jan. 9, 2008, in U.S. Appl. No. 10/997,650, filed Nov. 24, 2004, 18 pages.

Final Office Action dated Aug. 4, 2008, in U.S. Appl. No. 10/997,650, filed Nov. 24, 2004, 13 pages.

Office Action dated Mar. 20, 2012, in U.S. Appl. No. 12/618,698, filed Nov. 13, 2009, 42 pages.

Final Office Action dated Aug. 10, 2012, in U.S. Appl. No. 12/618,698, filed Nov. 13, 2009, 39 pages.

(56) References Cited

OTHER PUBLICATIONS

Office Action dated Aug. 30, 2013, in U.S. Appl. No. 12/618,698, filed Nov. 13, 2009, 38 pages.
Office Action dated Jul. 11, 2012, in U.S. Appl. No. 12/619,678, filed Nov. 16, 2009, 33 pages.
Final Office Action dated Dec. 21, 2012, in U.S. Appl. No. 12/619,678, filed Nov. 16, 2009, 23 pages.
Office Action dated Jun. 11, 2013, in U.S. Appl. No. 12/619,678, filed Nov. 16, 2009, 23 pages.
Final Office Action dated Nov. 7, 2013, in U.S. Appl. No. 12/619,678, filed Nov. 16, 2009, 21 pages.
Office Action dated Sep. 24, 2012, in U.S. Appl. No. 13/024,569, filed Feb. 10, 2011, 41 pages.
Final Office Action dated Feb. 15, 2013, in U.S. Appl. No. 13/024,569, filed Feb. 10, 2011, 26 pages.
Restriction Requirement dated Dec. 20, 2012, in U.S. Appl. No. 13/025,129, filed Feb. 10, 2011, 6 pages.
Office Action dated Mar. 14, 2013, in U.S. Appl. No. 13/025,129, filed Feb. 10, 2011, 46 pages.
Office Action dated Aug. 23, 2013, in U.S. Appl. No. 13/025,129, filed Feb. 10, 2011, 19 pages.
Final Office Action dated Jan. 16, 2014, in U.S. Appl. No. 13/025,129, filed Feb. 10, 2011, 15 pages.
Advisory Action dated Mar. 27, 2014, in U.S. Appl. No. 13/025,129, filed Feb. 10, 2011, 4 pages.
Final Office Action dated Feb. 28, 2014, in U.S. Appl. No. 12/618,698, filed Nov. 13, 2009, 23 pages.

\* cited by examiner

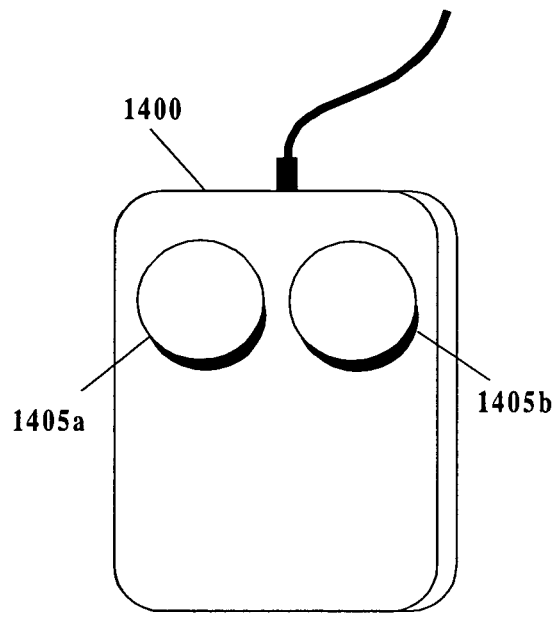
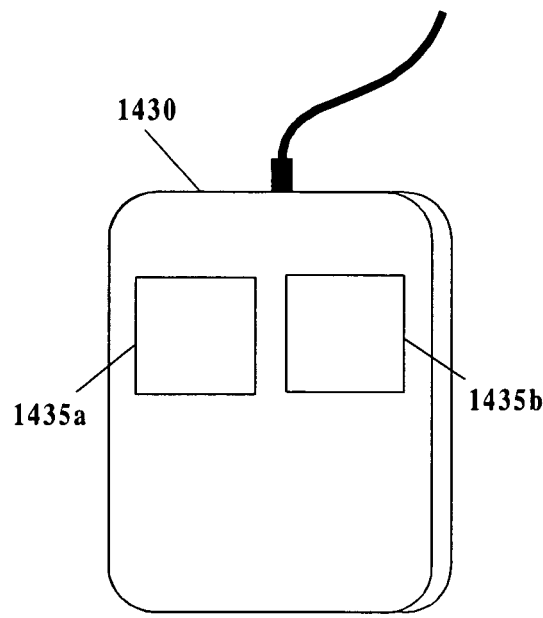
Figure 14a
Figure 14b
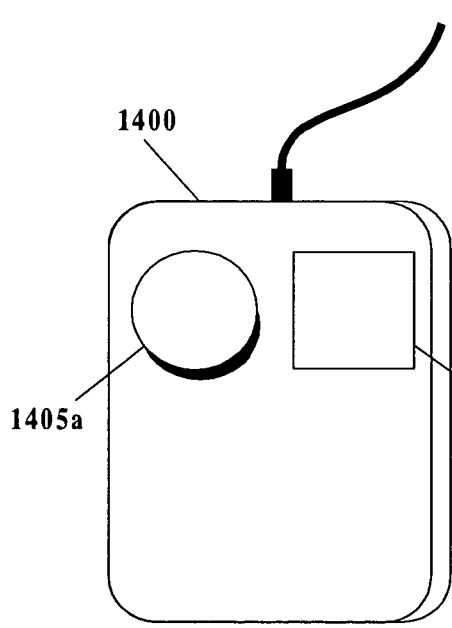
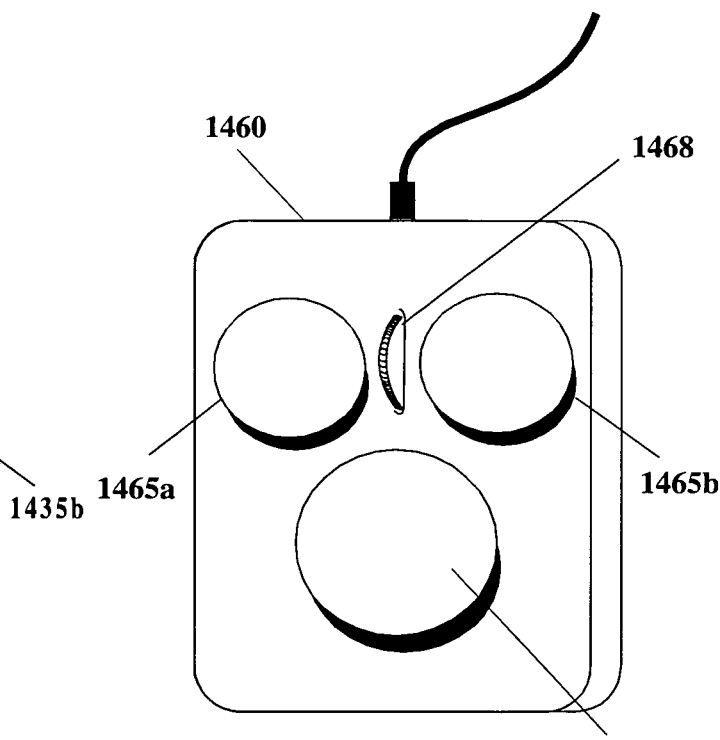
Figure 14c
Figure 14d

MOUSE-BASED USER INTERFACE DEVICE EMPLOYING USER-REMOVABLE MODULES

CROSS REFERENCE TO RELATED APPLICATIONS

This application is a continuation-in-part (CIP) of U.S. application Ser. No. 10/806,694, filed Mar. 22, 2004, which is a continuation of U. S. application Ser. No. 10/779,368, filed Feb. 13, 2004.

BACKGROUND OF THE INVENTION

1. Field of the Invention

This invention relates to user interface devices for use with a computer, and in particular to computer mice, trackballs, touchpads, multiple-parameter pointing and data entry devices, and user interface metaphors.

2. Description of the Related Art

User interface devices for data entry and graphical user interface pointing have been known for many years. The most common devices include the computer mouse (usually attributed to English, Engelbart, and Berman "Display-Selection Techniques for Text Manipulation, IEEE Transactions on Human Factors in Electronics, pp. 5-15, vol. HFE-8, No. 1, March 1967), the trackball, the touchpad in both finger-operated (for example, the various finger-operated devices produced by Symantec Corp., of Springfield, Oreg.) and stylus-operated (for example, products used with desktop workstation computers—Wacom Technology Corp., of Vancouver, Wash.) versions, and display-overlay touchscreens. Other historical and exotic devices include various types of light pens and the Data Glove™ (produced by VPL Research, Inc., of Redwood City, Calif.).

Most user interface devices for data entry and graphical user interface pointing commonly used with computers or with equipment providing computer-like user interfaces have two wide-range parameter adjustment capabilities that are usually assigned to the task of positioning a screen cursor within a two-dimensional display. In many cases, one, two, or three binary-valued "discrete-event" controls are provided, typically in the form of spring-loaded push-buttons.

More recently, computer mice have emerged that provide an additional "scroll" finger-wheel adjustment (for example, between two control buttons) to provide a third wide-range parameter adjustment capability (for example, various products developed by Logitech Inc., of Fremont, Calif.). A mouse of this configuration is often referred to as a "Scroll Mouse" since this third wide-range parameter is typically assigned the task of positioning a vertical scroll bar in an actively selected window. This additional finger-wheel adjustment may also operate as a spring-loaded push-button, thus providing an additional binary-valued "discrete-event" control. Typically this additional binary-valued "discrete-event" control is used to turn on and off an automatic scrolling feature which controls the rate and direction of automatic scrolling according to vertical displacement of the displayed cursor.

SUMMARY OF THE INVENTION

In an embodiment, the functionality of a conventional mouse is extended to provide an extended number of simultaneously adjustable user interface parameters employing one or more user-removable modules. In an embodiment, a user interface for controlling an external device, such as a computer, includes a first user interface sensor configured with a housing. This first sensor generates a first plurality of signals responsive to movement of the housing relative to two orthogonal axes. A compartment is configured with the housing and is sized to receive the user-removable module. This user-removable module contains a second user interface sensor, which generates a second plurality of signals responsive to user manipulation. Output is provided responsive to signals generated by the first and second user interface sensors. In another embodiment, the housing of an extended functionality mouse itself serves as a module removable from a compartment provided in another physical device.

Other embodiments of the invention include a freely-rotating trackball for simultaneously detecting one, two, or three independent directions of its non-rotational displacement, and as many as three independent directions (roll, pitch, and yaw) of its rotation. In various implementations, non-rotational displacement of the trackball may be measured or interpreted as a widely-varying user interface parameter or as a discrete "click" event. Signal processing may be used to derive three independent rotation components (roll, pitch, and yaw) from more primitive sensor measurements of the trackball. The invention provides for trackball displacement and rotation to be sensed by a variety of sensing techniques including optical, magnetic, electromagnetic, capacitive, resistive, acoustic, resonance, and polarization sensor. The system may be used to provide an extended number of simultaneously interactive user interface parameters, and may itself be incorporated into larger user interface structures, such as a mouse body.

In accordance with embodiments of the invention, a traditional hand-movable computer mouse is configured with an additional user interface sensor. For convenience, the term "user interface sensor" will be used herein to collectively refer to devices such as trackballs, touchpads, mouse devices, scroll-wheels, joysticks, and other such devices.

In one aspect of the invention, the addition of a user interface sensor provides alternative physical modalities for the same pair of adjustable parameters so that a user may switch between using the user interface device as a traditional hand-movable computer mouse and using the user interface device as a trackball or touchpad.

In another aspect of the invention, the addition of a user interface sensor provides alternative resolution modalities for the same pair of adjustable parameters so that a user may switch between using the invention as a traditional hand-movable computer mouse to obtain one level of parameter adjustment resolution, and using the invention as a trackball or touchpad, for example, to obtain a different level of parameter adjustment resolution.

In another aspect of the invention, the addition of a user interface sensor provides alternative types of warping modalities for the same pair of adjustable parameters so that a user may switch between using the invention as a traditional hand-movable computer mouse to obtain one type of parameter adjustment (for example, linear) and using the invention as a trackball or touchpad, for example, to obtain a different type of parameter adjustment (for example, logarithmic, gamma-corrected, arccosine, exponential, etc.).

In another aspect of the invention, the addition of a user interface sensor provides alternative offset modalities for the same pair of adjustable parameters so that a user may switch between using the invention as a traditional hand-movable computer mouse to obtain one type of centering of parameter adjustment and using the invention as a trackball or touchpad, for example, to obtain a different centering of parameter adjustment.

In another aspect of the invention, the addition of a user interface sensor may be used to provide additional parameters that may be simultaneously controlled.

In another aspect of the invention, the addition of a user interface sensor may be used to provide additional parameters that are of a different isolated context from those assigned to a traditional hand-movable computer mouse.

In a further more detailed aspect of the invention, the addition of a touchpad may be used to provide many additional parameters that are of a different context than those of a traditional hand-movable computer mouse.

In a further more detailed aspect of the invention, the touchpad may be a null-contact touchpad adapted to measure at least one maximum spatial span of contact in a given direction.

In a yet further detailed aspect of the invention, the null-contact touchpad is adapted to measure at least one maximum spatial span of contact in a given direction at a specifiable angle.

In an additional further detailed aspect of the invention, the null-contact touchpad is adapted to measure pressure applied to the null-contact touchpad.

In a further more detailed aspect of the invention, the touchpad may comprise a pressure sensor array touchpad adapted to measure, among other things, one or more of the following: the rocking position of a contacting finger in a given direction; the rotational position of a contacting finger; the pressure of a contacting finger; and parameters relating to a plurality of contacting fingers.

In another aspect of the invention the addition of a user interface sensor may be realized via a replaceable module accepted by an adaptation of a traditional hand-movable computer mouse. In this implementation, a user may initially obtain the invention in one configuration and field-modify it to another configuration.

In another aspect of the invention, a traditional hand-movable computer mouse may be implemented as a removable module in a laptop computer or other affiliated equipment, and may include a wireless link with the laptop computer or other affiliated equipment.

In yet a further aspect of the invention, a traditional hand-movable computer mouse is implemented as a removable module in a laptop computer or other affiliated equipment, and the mouse further comprises a user interface sensor.

In another aspect of the invention, a traditional hand-movable computer mouse additionally comprises a trackball or touchpad, for example. In this aspect, the mouse comprises a wireless link to an associated computer or other affiliated equipment.

In another aspect of the invention, a visual display is provided.

In another aspect of the invention, auditory output is provided.

In another aspect of the invention, two or more individual user interface sensors may be combined without incorporation of such sensors with a traditional hand-movable computer mouse.

BRIEF DESCRIPTION OF THE DRAWINGS

The above and other aspects, features and advantages of the present invention will become more apparent upon consideration of the following description of preferred embodiments taken in conjunction with the accompanying drawing figures, wherein:

FIGS. 14a-14d illustrate exemplary embodiments of a mouse where the traditional mouse buttons have been replaced by trackballs or touchpads;

DETAILED DESCRIPTION OF THE PREFERRED EMBODIMENTS

Figure 1A:
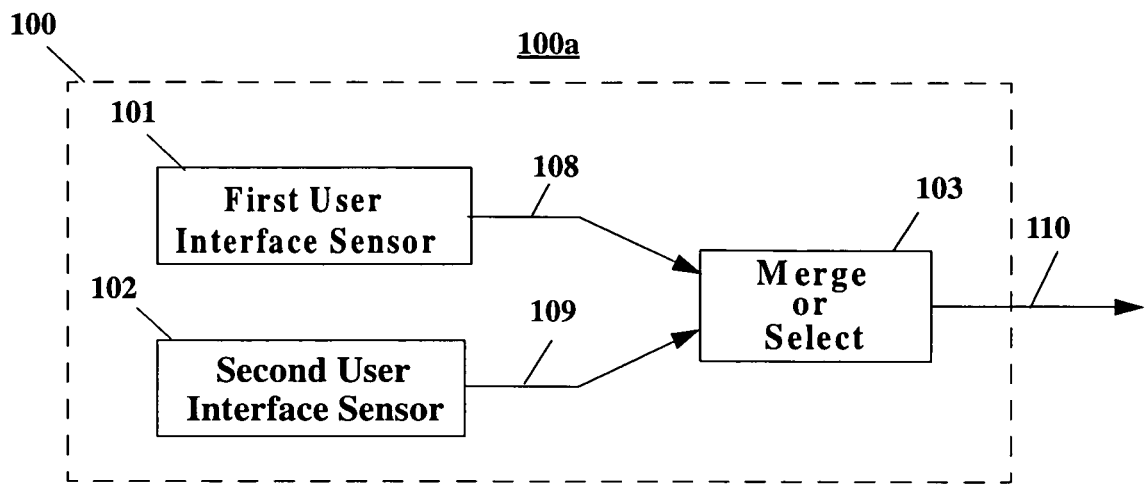
FIGS. 1a-1i illustrate various exemplary implementations involving merging, selecting, multiplexing, and preprocessing distributed in various ways between the body of the user interface device and an associated piece of equipment.

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

By way of overview, a number of different applications that take advantage of the functionality of additional, wide-range adjustment parameters will now be discussed. In one example, an additional finger-wheel adjustment device providing a third, wide-range parameter adjustment capability is typically assigned to vertical scroll bar positioning. In accordance with the invention, such a design may be supplemented with a fourth, wide-range parameter adjustment capability so that a horizontal scroll bar position control may be achieved. With the increasing popularity of the web (with many web pages wide enough to require horizontal scrolling) and publisher layout tools (typically involving pages wide enough to require horizontal scrolling), as well as the need for simultaneous interactive horizontal and vertical scrolling actions that do not disturb a screen cursor location when using "zoom" controls, a fourth wide-range parameter adjustment capability in traditional user interface devices for data entry and graphical user interface pointing is quite valuable.

There are many other potential uses for additional wide-range adjustment parameters in traditional user interface devices for data entry and graphical user interface pointing. Some opportunities have wide-range applicability, such as in providing interactive separate adjustment of the selections for "cut" or "copy" operations from the interactive adjustment of insertion location or selection for a "paste" operation. Other opportunities are more specialized but still widely applicable, such as making an active selection from a clip-art or symbol library and adjusting the position or other attributes of said active selection in a drawing or layout application. Yet other opportunities may be very specialized, such as in 3D modeling, data visualization, advanced color adjustment, lighting control, machine control, or audio and image signal processing.

There are many opportunities for adjusting the same two widely-varying parameters in more than one way. For example, one user interface modality (such as normal mouse operation) may be used for normal parameter adjustment, while a second user interface modality may be used for adjustments involving a different resolution, warping (i.e., logarithmic, gamma-corrected, arccosine, exponential, etc.), centering offset, etc. Another important case is where the same two widely-varying parameters are controlled with the same resolution, warping, offset, etc., but in a different user interface modality (e.g., a trackball or touchpad may have some advantages in certain situations over use of a traditional mouse). A more widely applicable example is that of responding to and preventing hand/wrist/arm fatigue and injury. A traditional mouse fitted with an additional user interface sensor allows a user to interchangeably enter information with either the mouse body or another user interface sensor, changing which user interface modality is used (obtaining the same results with either) to relieve fatigue or pain, or prevent injury.

More specifically, the addition of a user interface sensor provides many opportunities for alternative means of adjustment of a common pair of adjustable parameters. The user may benefit from having both adjustment modalities available, changing modalities as needed or desired. For example:

A user may simply switch between using the invention as a traditional hand-movable computer mouse and using the invention as another kind of user interface sensor.

The user may benefit from having both modalities available to avoid or in response to hand fatigue.

The user may also benefit from having both modalities available due to the type of pointing or data entry interaction needed—depending on the case, one type of modality may perform better than another.

The trackball, touchpad, or other user interface sensor apparatus may be used to provide alternative resolution modalities so that a user may switch between using the invention as a traditional hand-movable computer mouse to obtain one level of parameter adjustment resolution and using the invention as a user interface sensor to obtain a different level of parameter adjustment resolution.

The trackball or touchpad may be used to provide alternative warping modalities for the same pair of adjustable parameters so that a user may switch between using the invention as a traditional hand-movable computer mouse to obtain one type of parameter adjustment (for example, linear) and using the invention as another kind of user interface sensor to obtain a different type of parameter adjustment resolution (for example, logarithmic, gamma-corrected, arccosine, exponential, etc.).

The user interface sensor may be used to provide alternative offset modalities for a common pair of adjustable parameters so that a user may switch between using the invention as a traditional hand-movable computer mouse to obtain one centering of parameter adjustment and using the invention as another kind of user interface sensor to obtain a different centering of parameter adjustment. These modalities can provide one or more "location bookmarks" for cursor location, each affiliated with a sub-context within an interactive application.

Further, the addition of another user interface sensor provides many opportunities for the simultaneous adjustment of additional parameters that may or may not require simultaneous interactive control. The traditional computer mouse may be used to simultaneously adjust two parameters while the additional user interface sensor may be configured to allow the fingers to simultaneously adjust at least two additional parameters. In some applications, these additional parameters may be closely related to those assigned to the traditional computer mouse. For example, the traditional computer mouse may be used to simultaneously adjust the location within a window of a text, graphic, or other object, while the additional user interface sensor allows the fingers to be used to adjust the type or attributes of the text, graphic, or other object. In other applications, these additional parameters may be of a different isolated context from those assigned to the traditional computer mouse. For example, the traditional computer mouse may be used to simultaneously adjust two parameters dealing with affairs within an active application window, while the addition of another user interface sensor allows the fingers to be used to adjust at least two additional parameters dealing with broader window system affairs such as vertical and horizontal scrollbars, window selection, window resizing, etc., or intermediate-level affairs such as zoom control, help-window navigation, clip-art selection, etc. Another application would be to provide separate adjustment of selections for "cut" or "copy" operations from the adjustment of insertion location or selection for a "paste" operation.

In instances of the invention involving the addition of a touchpad, the touchpad may be configured and/or enhanced to allow the fingers to adjust three or more additional interactive measured parameters. These additional interactive measured parameters may be assigned to control more sophisticated interactive affairs such as 3-dimensional space position, 3-dimensional space orientation, color model navigation, image or audio processing parameter settings, etc.

The additional interactive measured parameters (above the two typically associated with traditional touchpads) may be provided in a number of ways. For example, the touchpad may be a relatively low-cost null-contact touchpad that has been adapted to measure at least one maximum spatial span of contact in a given direction. The user may also control an additional parameter by varying the width between the spatial extremes of a single point of contact (i.e., how much finger flesh makes contact with the pad) or multiple points of contact (i.e., the spread between two contacting fingers). As there are two geometrically orthogonal sensing directions on a touchpad, this provides the user with a method for controlling four total parameters from a touchpad. Further, rotational transformations or other methodologies may be used to measure the angle of rotation of an oblong contact profile. The measured angle may be used as a fifth interactive parameter, and/or used to adapt the measurement of maximum spatial span of contact in an arbitrary angle. The null-contact touchpad may be further adapted to measure pressure applied to the null-contact touchpad via, for example, use of an attached pressure sensor. The pressure may be used as a sixth interactive parameter, and may or may not have rapid pressure changes recognized as 'tap' or 'click' events.

Another way to provide the additional interactive measured parameters (above the two typically associated with traditional touchpads) with a touchpad is to implement the touchpad with a pressure sensor array. Through use of operations effectively amounting to image processing, a pressure sensor array touchpad can be adapted to measure the rocking position of a contacting finger in two orthogonal directions, as well as the rotational position and average pressure of a contacting finger. Thus a pressure sensor array touchpad can be adapted to provide up to six widely variable interactive adjustable parameters from the contact of a single finger. A pressure sensor array touchpad can be further adapted to measure parameters relating to a plurality of contacting fingers.

All of these considerations and others demonstrate the potential value in providing the addition of another user interface sensor to a traditional hand-movable computer mouse. In the descriptions to follow, various implementations and exemplary applications of exemplary embodiments are considered and explained.

1. Exemplary Signal Flow and Processing

The invention provides for a wide range of signal flow and processing configurations and implementations. FIGS. 1a-1i illustrate various exemplary implementations involving merging, selecting, multiplexing, and preprocessing distributed in various ways between the body of the user interface device and an associated piece of equipment. FIGS. 1a-1d concern the aggregated pair of user interface sensors in isolation, while FIGS. 1e-1i address arrangements where some functions of the invention are performed in the associated external equipment. It is noted that the invention further provides for any of these exemplary functionalities, as well as other functionalities, to be combined or made selectable. In any of the exemplary implementations disclosed herein, power may be supplied to these implementations by the associated external equipment or by other devices such as batteries, storage capacitors, photoelectric devices, and the like.

FIG. 1a shows an implementation 100a featuring two user interface sensors 101, 102, each of which may be a particular type of user interface sensor (which again may be a trackball, touchpad, mouse, or other user interface device) that can be collocated within the common physical enclosure 100 (demarcated by the dotted-line boundary). First user interface sensor 101 produces signal 108 and second user interface sensor 102 produces another signal 109, which are directed to a merge or select function 103. The merge or select function produces outgoing signal 110 which is provided to associated external equipment. Here signals 108, 109 (from first and second user interface sensors 101, 102) would typically lose their individual identities within the outgoing signal 110 and as such may be used or processed interchangeably (without individual attribution to either the first or second user interface sensor) by the associated external equipment.

Merge or select function 103 may take several forms in various implementations. For example, in one embodiment it may simply be fixed to only perform a merge operation. In another embodiment it may only provide a selection function; here the selection function may be controlled by the user using a switch or some sort of action, or the selection may be remotely controlled by external equipment. As an alternative, merge or select function 103 may instead provide a user adjustable "merge" or "select" function.

Figure 1B:
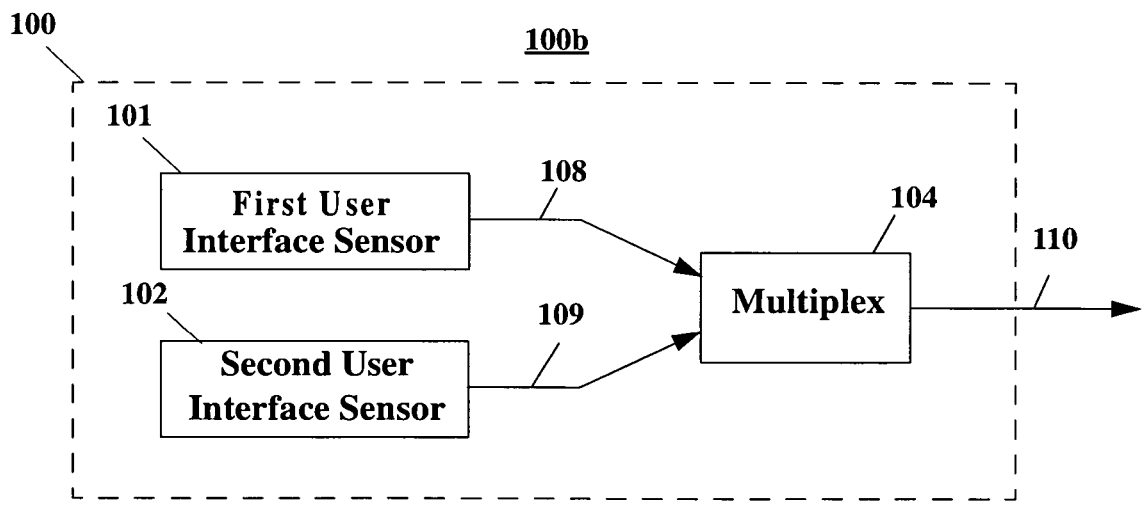

FIG. 1b shows an implementation that is similar to that of FIG. 1a. The primary difference is that the FIG. 1b implementation 100b replaces merge or select function 103 of FIG. 1a with multiplex function 104 to produce outgoing signal 110. Here signals 108, 109 (from first and second user interface sensors 101, 102) retain their individual identities within outgoing signal 110 and as such may be used or processed separately by the associated external equipment.

Figure 1C:
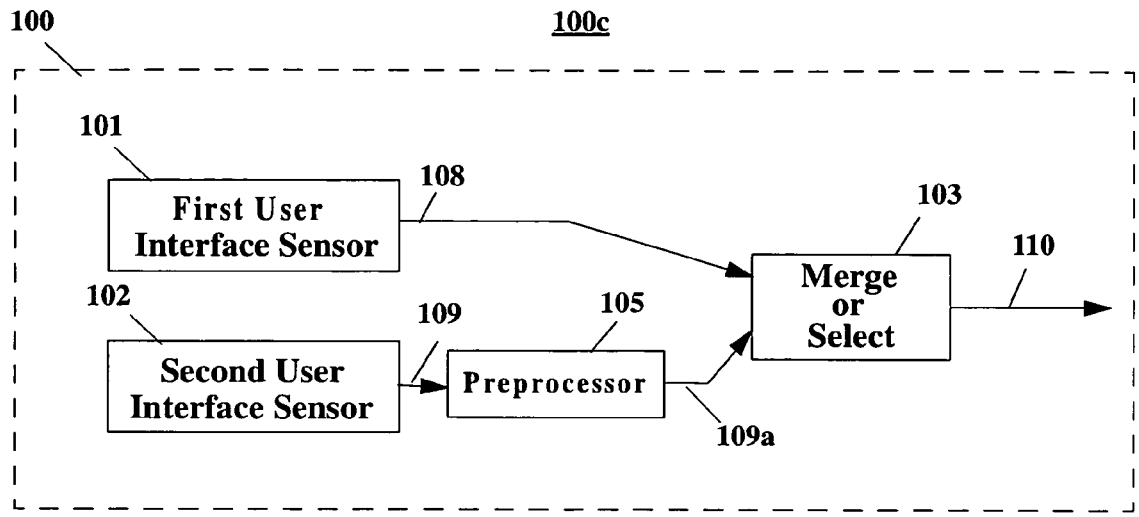

FIG. 1c shows implementation 100c which is similar in many respects to that of FIG. 1a. However, the FIG. 1c embodiment utilizes preprocessor 105 applied to signal 109 to produce processed signal 109a. The processed signal 109a, along with signal 108, is directed to merge or select function 103, resulting in outgoing signal 110. Preprocessor 105 may thus introduce a pre-processing step (such as resolution modification, warping modification, offset modification, etc.) on signal 109 to produce a signal of distinguished value from that of signal 108.

Figure 1D:
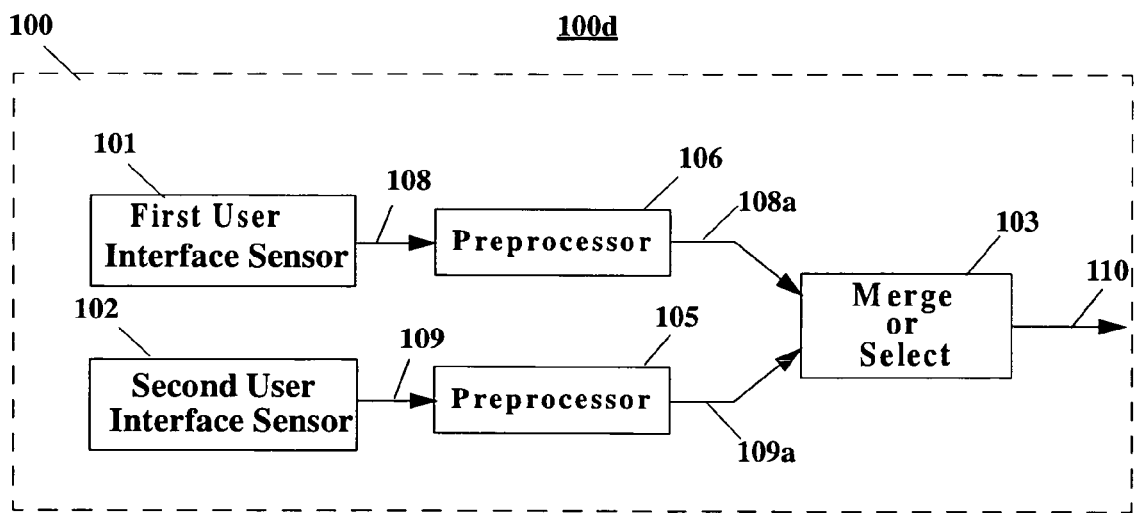

FIG. 1d illustrates another exemplary implementation 100d which is similar to that of FIG. 1c but with an additional preprocessor 106 applied to signal 108. Preprocessor 106 produces processed signal 108a, which along with signal 109a, is directed to merge or select function 103 to produce outgoing signal 110. Preprocessor 106 may therefore introduce a pre-processing step (such as resolution modification, warping modification, offset modification, etc.) on signal 108 to produce a signal of either equivalent or distinguished value from that of signal 109a.

Figure 1E:
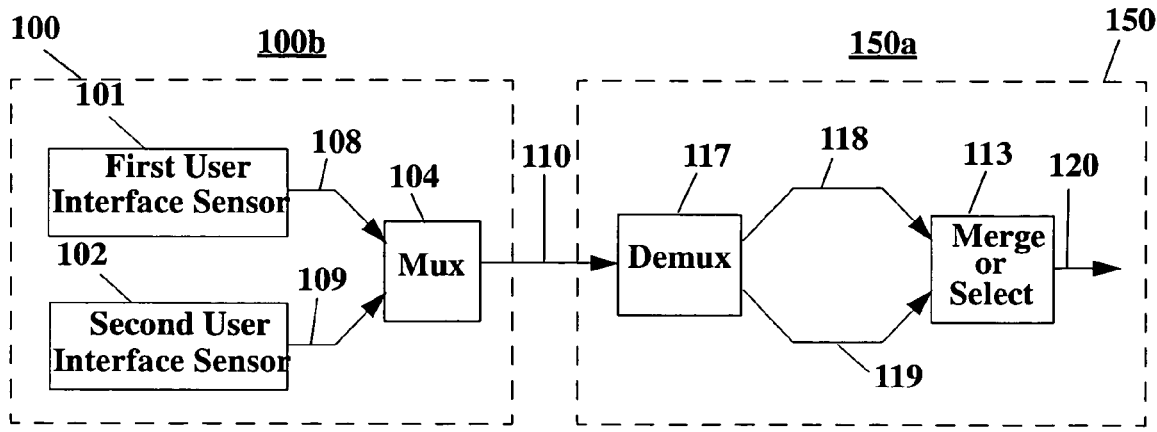

FIG. 1e shows implementation 100b of FIG. 1b (which features two user interface sensors 101, 102 and a multiplex function 104 producing an outgoing signal 110) used in conjunction with subsequent functions provided by associated external equipment 150a. These subsequent functions are shown within the functional boundary 150 of the associated external equipment 150a.

Outgoing signal 110 from the common physical enclosure 100, is presented to demultiplexer 117 within external equipment 150a. Demultiplexer 117 produces signal 118 corresponding to or associated with pre-multiplexed signal 108, and an additional signal 119 corresponding to or associated with the pre-multiplexed signal 109. Here, signals 118, 119 are presented to merge or select function 113 producing merged or selected signal 120. This implementation is functionally similar or equivalent to that of FIG. 1a except that the various types of merge or selection functions 103 are provided within the associated external equipment 150a (for example in software, perhaps within an application where it is customized for the needs of that application) rather than being provided within physical unit 100b.

Figure 1F:
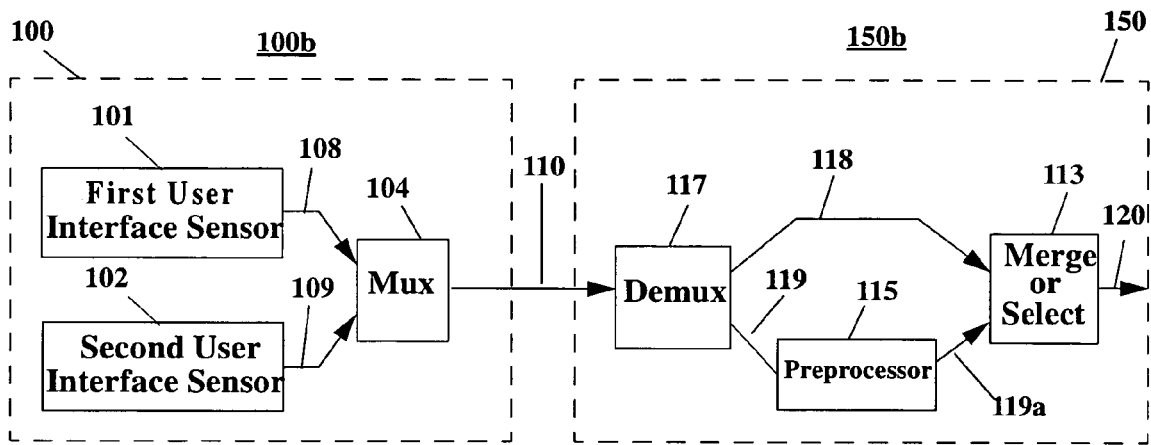

FIG. 1f shows implementation 100b of FIG. 1b used in conjunction with subsequent functions provided by associated external equipment 150b, and similar to that of FIG. 1e, except signal 119 produced by demultiplexer 117 is directed to preprocessor 115 to produce processed signal 119a before being sent to merge or selection function 113. This implementation is thus functionally similar or equivalent to that of FIG. 1c except that the various types of merge or selection 103 and preprocessor 105 functions in FIG. 1c are provided within the associated external equipment 150b (for example in software, perhaps within an application where it is customized for the needs of that application) rather than being provided within the physical unit 100b.

Figure 1G:
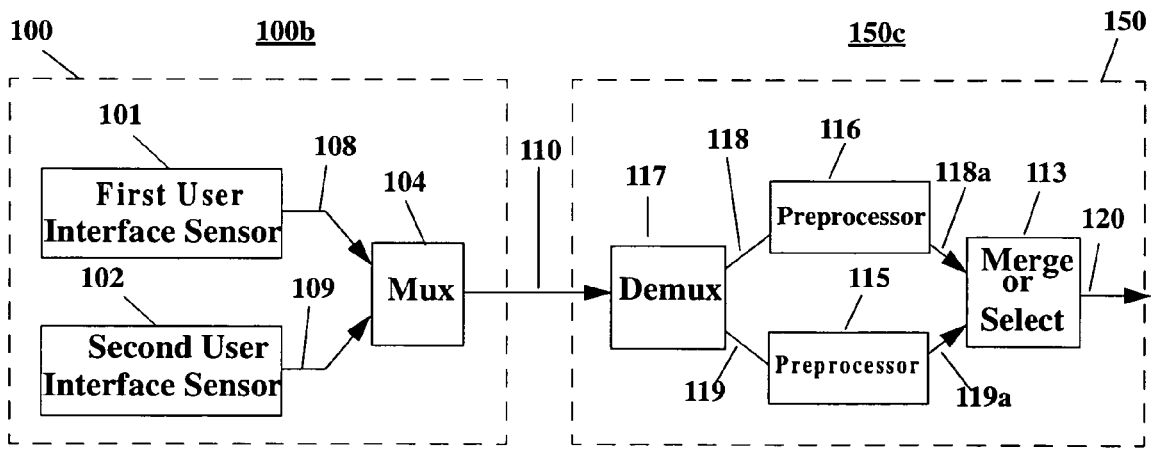

FIG. 1g shows implementation 100b of FIG. 1b used in conjunction with subsequent functions provided by associated external equipment 150c. This arrangement expands on that shown in FIG. 1f in that signal 118 produced by demultiplexer 117 is directed to preprocessor 116 to produce processed signal 118a. The processed signal is then sent to merge or selection function 113. This implementation is thus functionally similar or equivalent to that of FIG. 1d except that the various types of merge or selection 103 and preprocessor 105, 106 functions in FIG. 1d are provided within the associated external equipment 150c (for example in software, perhaps within an application where it is customized for the needs of that application) rather than being provided within the physical unit 100b.

Figure 1H:
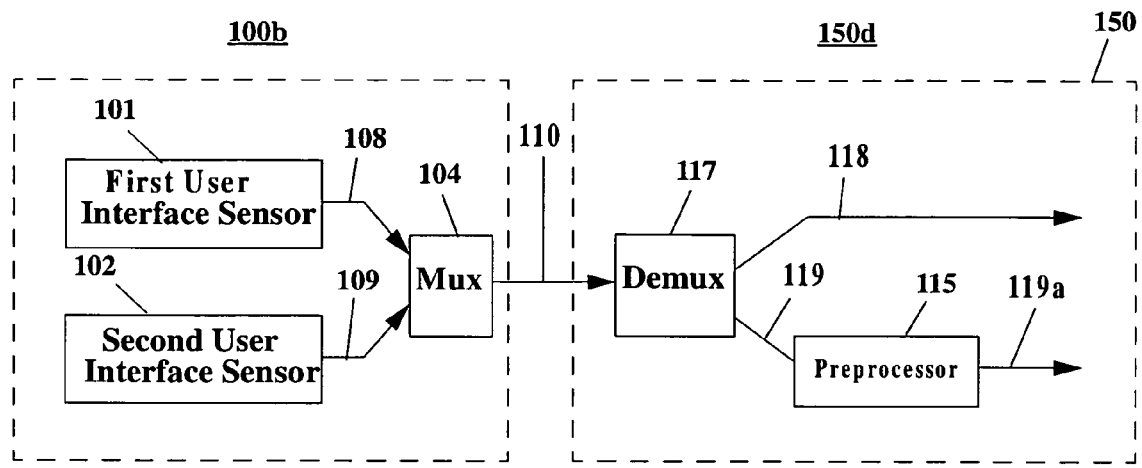

FIG. 1h shows implementation 100b of FIG. 1b used in conjunction with subsequent functions provided by associated external equipment 150d. Here again, as in the arrangement of FIG. 1f, signal 119 produced by demultiplexer 117 is directed to preprocessor 115 to produce processed signal 119a. In contrast to other embodiments, processed signal 119a is not directed to merge or selection 113 function and retains its identity for use by a different destination from that of signal 118 within associated external equipment 150d.

Figure 1I:
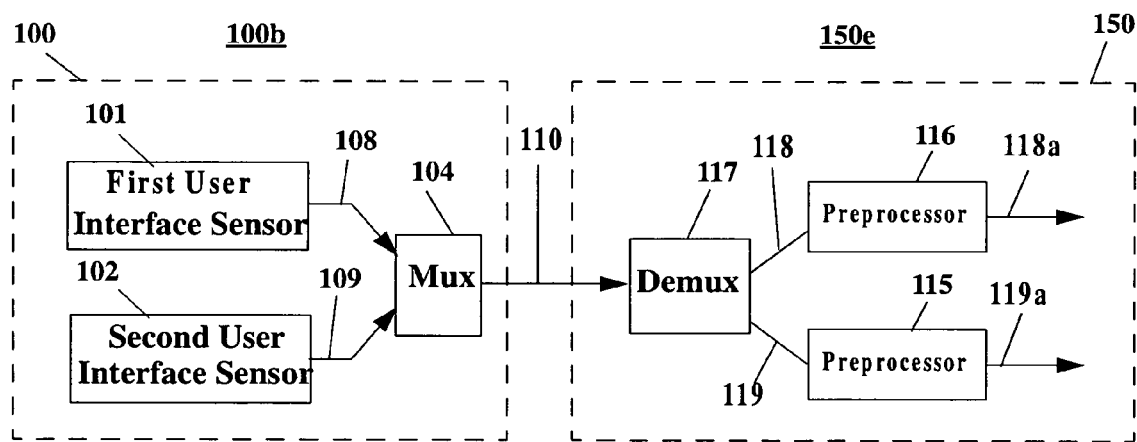

As a final illustrative example in this series, FIG. 1i shows implementation 100b of FIG. 1b used in conjunction with subsequent functions provided by associated external equipment 150e. Here, as in the arrangement of FIG. 1g, signals 118, 119 produced by demultiplexer 117 are directed to preprocessors 115, 116 to produce processed signals 118a, 119a. In contrast to other embodiments, processed signals 118a, 119a are not directed to merge or selection 113 function and thus retain their identity for use by differing destinations within associated external equipment 150e.

Having presented various exemplary signal flows and processing realizations provided for by the invention, attention is now directed to exemplary implementations utilizing specific types of user interface sensors. It is to be understood that the various sensors, techniques and methods disclosed herein may be implemented using computer software, hardware, and firmware, and combinations thereof.

2. Implementations Utilizing Specific Types of Additional User Interface Sensors In this section, a number of exemplary implementations of the invention utilizing various types of additional user interface sensors added to an original user interface sensor or device. The first three sections address cases where the original user interface sensor is a movable mouse and the additional user interface sensor is a trackball, touchpad, or other exemplary technology, including additional scroll-wheels. Then exemplary adaptations of trackballs and touchpads, each traditionally used to provide simultaneous adjustment of two interactive widely-varying parameters, are extended to provide simultaneous adjustment of as many as six interactive widely-varying parameters and other forms of control. This section continues by presenting exemplary implementations where the original user interface sensor is not a mouse, where there are a plurality of additional user interface sensors, where there is a visual display or auditory output, where the additional user interface sensor is a removable module, and where the implementation itself is a removable module.

2.1 Trackball Implementations of Additional User Interface Sensors

Figure 2A:
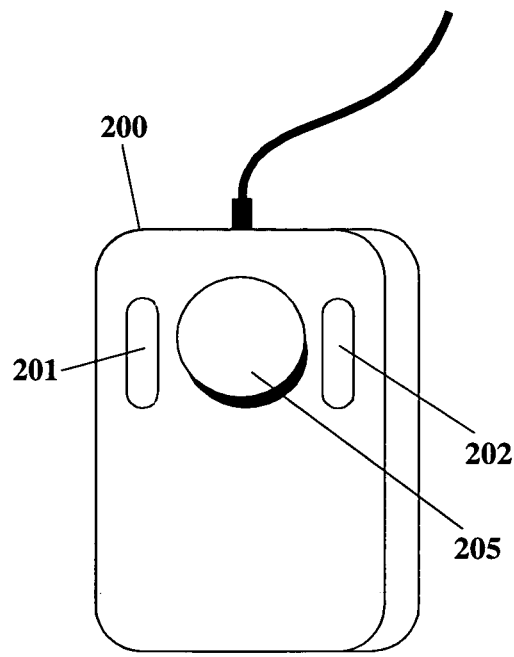
FIGS. 2a-2c depict an embodiment of the invention comprising a traditional mouse fitted with a trackball, illustrating three exemplary button configurations.
Figure 2B:
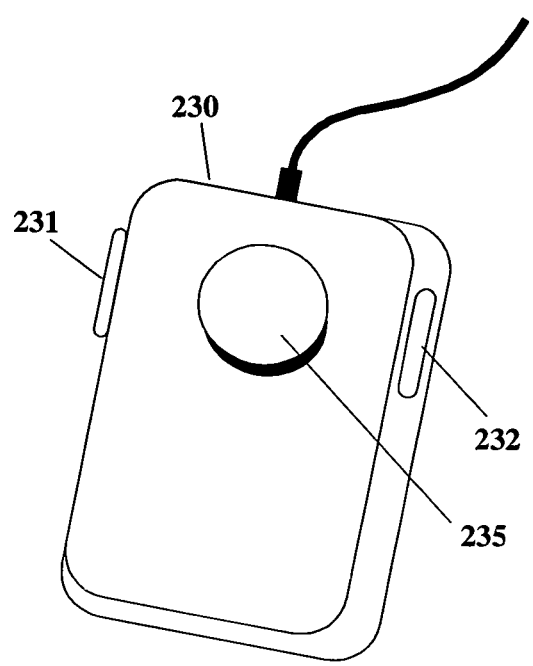
Figure 2C:
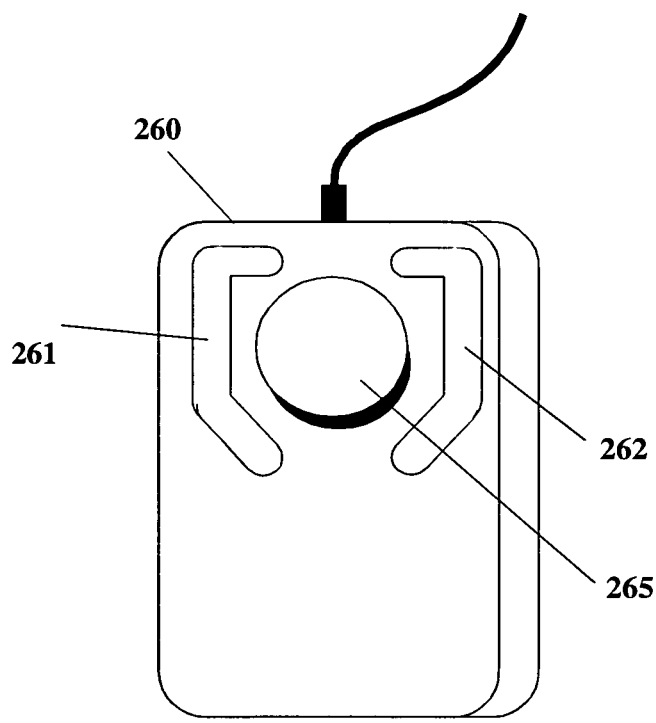

FIGS. 2a-2c illustrate a number of implementations provided for by the invention where a trackball controller is used as an additional user interface sensor apparatus incorporated into a traditional hand-movable computer mouse. In each of these implementations it is understood that the trackball may be freely operated without disturbing previous or currently-varying parameter adjustments made by the mouse.

In one implementation, a trackball controller is added to the top surface of a conventional computer mouse as depicted in FIG. 2a. The conventional mouse buttons may be located in various places in view of the presence of the trackball and in synergy with it. In the configuration depicted in FIG. 2a, buttons 201 and 202 are located on the surface of mouse 200; button 201 being on the left of the trackball and button 202 being on the right of the trackball.

In a second configuration depicted in FIG. 2b, buttons 231 and 232 are now separated and located on the sides of mouse 230 as is the case with many trackball interfaces; button 231 being on the left side of mouse 230 and button 232 being on the right side of the mouse.

In a third possible configuration depicted in FIG. 2c, elongated buttons 261 and 262 are shown located on the surface of the mouse 260; button 261 wraps around the left of the trackball and button 262 wraps around the right of the trackball. The elongated buttons 261 and 262 may be positioned so that a user can readily and rapidly move fingers from trackball 265 to buttons 261 and 262, or even operate one of these buttons with one finger while another finger contacts trackball 265.

It is noted that unlike the touchpad described below, the trackball has an effectively unconfined range of contiguous data entry.

2.2 Touchpad Implementations of Additional User Interface Sensor

Figure 3A:
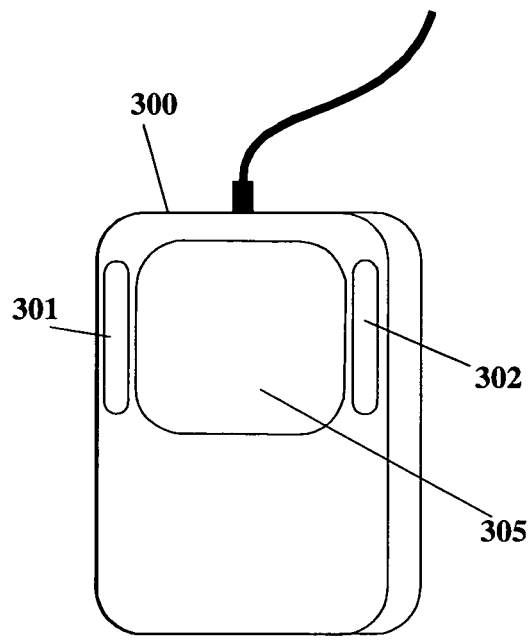
FIGS. 3a-3c depict an embodiment of the invention comprising a traditional mouse fitted with a touchpad, illustrating three exemplary button configurations.
Figure 3B:
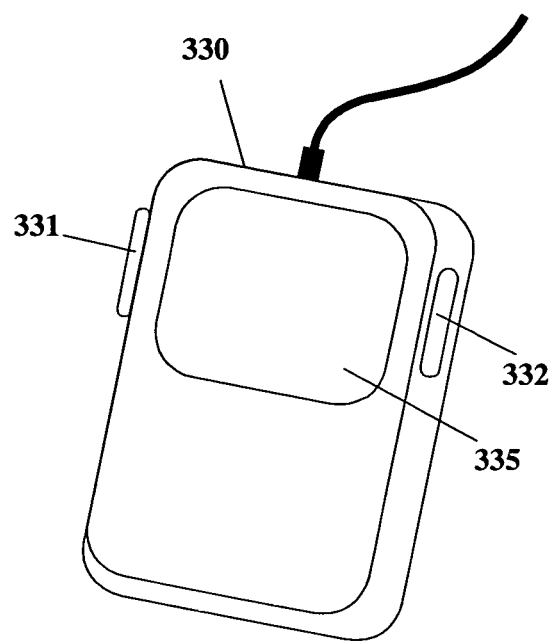
Figure 3C:
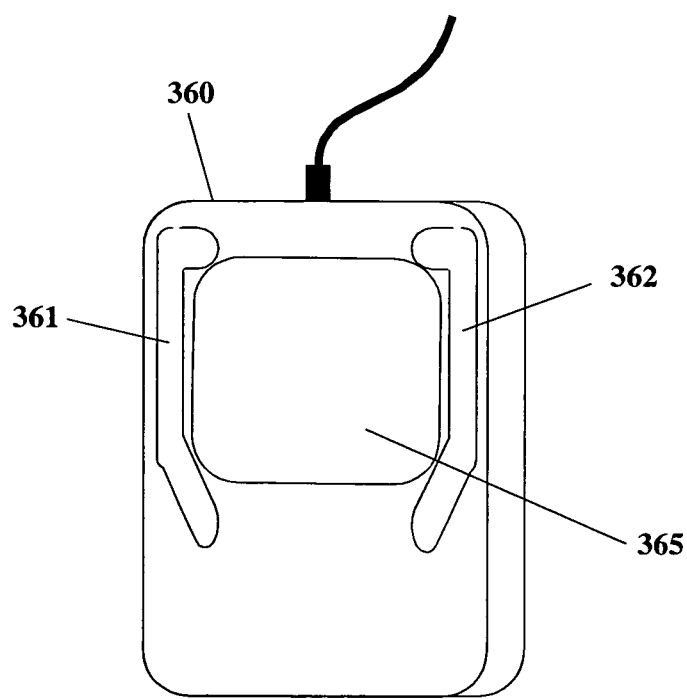

FIGS. 3a-3c illustrate a number of exemplary implementations provided for by the invention where a touchpad controller is used as an additional user interface sensor incorporated into a traditional hand-movable computer mouse. In each of these implementations it is understood that the touchpad may be freely operated without disturbing previous or currently-varying parameter adjustments made by the mouse.

In one implementation, trackball 205 in FIG. 2a can be replaced with touchpad 305 as shown in FIG. 3a. Additionally, this touchpad implementation can also support the alternative button configurations of FIGS. 2b and 2c. By way of illustration, FIG. 3b shows buttons 331, 332 positioned on either side of the mouse body 330, while FIG. 3c shows elongated buttons 361, 362 on the surface of the mouse wrapping around either side of touchpad 365.

It is noted that unlike the trackball, the touchpad typically has a confined maximum range of data entry by contiguous operation of a finger, stylus, etc.

2.3 Other Implementations of Additional User Interface Sensors

In accordance with other embodiments, the invention provides for still other types of additional user interface sensors. In each of these embodiments it is understood that any of these user interface sensors may be freely operated without disturbing previous or currently varying parameter adjustments made by the mouse or other associated device.

As a first example, an X-Y joystick may be used in place of the trackball or touchpad described above. The joystick may have a spring-return or may retain the last position it was placed. Similar to the touchpad and unlike the trackball, the X-Y joystick typically has a confined maximum range of travel.

As another example, two or more scrolling finger wheels may be used in place of the trackball or touchpad described above. The scrolling finger wheels may be implemented with an unconfined maximum range of travel similar to the trackball, or with a confined range of travel like the touchpad and X-Y joystick. In this embodiment, it may be advantageous to have one or more finger scroll-wheels mounted with its adjustment direction perpendicular to that of another finger scroll-wheel so that each wheel may be appropriately associated with vertical and horizontal scroll bars of a window, or other useful orthogonally-based user interface metaphor. For example, looking ahead to FIGS. 10a and 10b, embodiments 1000 are depicted comprising the usual components of a scroll-wheel mouse (mouse body 1001, buttons 1011 and 1012, and the usual scroll wheel 1021) complemented with an additional scroll wheel 1022 with adjustment direction perpendicular to that of finger scroll-wheel 1021.

As another example, two or more rotating control knobs may be used in place of the trackball or touchpad described above. Like the scrolling finger wheels, the rotating control knobs may be implemented with an unconfined maximum range of travel like the trackball or with a confined range of travel like the touchpad and X-Y joystick.

The invention also provides for more exotic types of user interface sensor technologies—for example, proximity detectors of various types (RF, infrared, etc.), video cameras (using any of the techniques provided in U.S. Pat. No. 6,570,078), and other emerging and unforeseen technologies—to be used as the additional user interface sensor aggregated in the same physical enclosure as the first user interface sensor.

2.4 Larger numbers of Interactively Widely-Varying Adjustable Parameters from the Additional User Interface Sensor In accordance with embodiments of the invention, additional user interfaces may be used to capture larger numbers (i.e., more than two) of widely-varying adjustable parameters from the additional user interface sensor. Some examples are provided here, but many others are possible as may be readily understood by one skilled in the art.

Figure 4A:
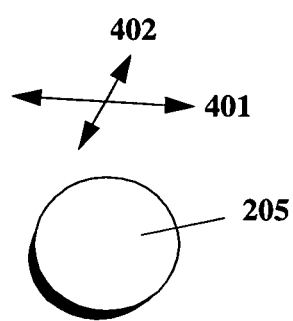
FIGS. 4a-4d depict various exemplary degrees of freedom that may be measurably assigned to a trackball for interactively controlling parameters in a user interface.
Figure 4B:
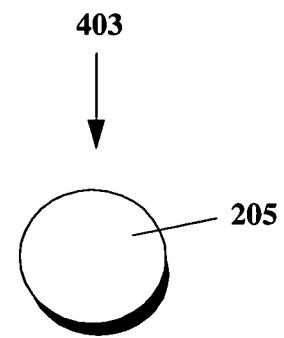

FIGS. 4a-4d address the case of the trackball. FIG. 4a illustrates a freely-rotating trackball 205 and the two principle orthogonal adjustment directions 401, 402 that are responsively resolved and measured in traditional trackball user interface devices. However, at least two other physical degrees of freedom may be readily exploited, and at least six total parameters can be interactively adjusted and measured. FIG. 4b shows the application of downward pressure 403 on trackball 205. Such pressure 403 may be applied without disturbing current values established in orthogonal adjustment directions 401, 402. Further, the trackball may be implemented so that downward pressure 403 may be applied while simultaneously adjusting trackball 205 in orthogonal adjustment directions 401, 402, particularly if the signal produced by the measurement of downward pressure 403 incorporates a modest "grace" zone of non-responsiveness for light pressure values. Downward pressure impulses may alternatively be sensed and treated as discrete event "taps," as commonly used in contemporary touchpad interfaces found in laptop computers, for example.

Figure 4C:
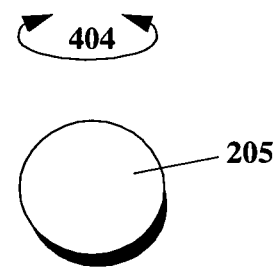
Figure 4D:
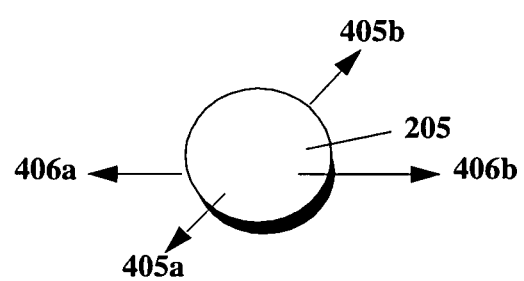

FIG. 4c shows the application of "yaw" rotation 404 (i.e., rotation around the vertical axis) of trackball 205. This yaw rotation 404 may be applied without disturbing current values established in orthogonal adjustment directions 401, 402 and can be readily measured and adjusted as a widely-varying parameter. Further, by grasping trackball 205 (or other operational methods), the yaw rotation 404 and traditional orthogonal adjustment directions 401, 402 may be independently and simultaneously adjusted. It is also noted that in principle up to six widely-varying physical degrees of freedom can be simultaneously measured from a properly configured trackball 205 by placing the trackball 205 in a cradle that senses not only downward pressure 403 or displacement but also lateral pressure or displacement. As shown in FIG. 4d, both forward-backward, non-rotational force 405 and left-right, non-rotational force 406 may be applied to the trackball in a manner that the values of force or displacement in each of these directions 405, 406 can be independently measured. Thus, by grasping trackball 205 (or other operational methods), three rotational directions of orientation 401, 402, 404 and three non-rotational directions of force or displacement 403, 405, 406 may be independently and simultaneously adjusted by a user and measured as six independent interactively adjustable user interface parameters. These correspond, effectively, to measurable adaptations of the six degrees of freedom of an orientable object in 3-dimensional space as found in classical mechanics and aeronautics—that is:

"roll" rotation (adapted to 401)
"pitch" rotation (adapted to 402)
"up-down: displacements (adapted to 403)
"yaw" rotation (adapted to 404)
"forward-backward" displacements (adapted to 405)
"left-right" displacements (adapted to 406).

Most trackball sensing technologies use optically based techniques for sensing the two traditional components of rotation ("roll" and "pitch") of the trackball. Trackball 205 itself may be configured with an optical pattern on it with spatially varying reflectivity for a range of the light spectrum. The pattern may be such that it can spatially vary light reflectively in these two traditional components of trackball rotation. Alternatively, two spatially varying reflectivity patterns, each active at different ranges of the light spectrum or light polarization, may be superimposed or integrated with the trackball.

Figure 4E:
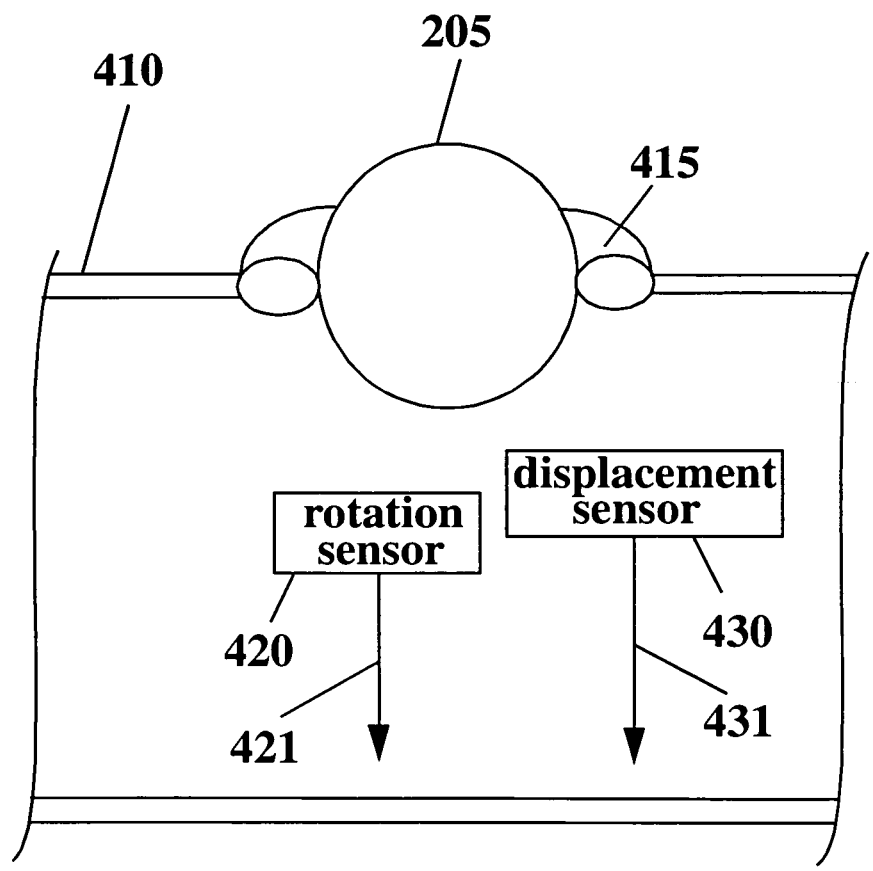
FIG. 4e depicts a freely rotating trackball and associated displacement and rotation sensors.

A number of approaches may be used to obtain measurements for all three directions of rotation. In one completely optical approach, a second or third spatially varying reflectivity pattern active at, respectively, a second or third portion of the light spectrum (or light polarization if available) may be superimposed or integrated with the patterns employed for traditional "roll" and "pitch" rotation sensing, and an additional optical source and sensor 420 is used to obtain measurement of the added varying reflectivity pattern, as shown in FIG. 4e. Depending on the pattern(s) used, sensor signals 421 may be directly usable or may require processing of the three primitive signals measured by the sensors to obtain a clean decomposition of the measurement signals into independent "roll," "pitch," and "yaw" signals independently responsive to the "roll," "pitch," and "yaw" components of trackball rotation.

As another alternative, trackball 205 may include internally, or on its surface, or both, materials with spatially varying patterns of magnetic properties, capacitive properties, electromagnetic properties, ultrasonic acoustic properties, resonance phenomena of any of these properties, polarization phenomena of any of these properties, etc., individually or in combination, each of which may be active at specific ranges of polarization, frequencies, etc. These may be used together with or in place of optical measurement approaches. Again, depending on the pattern(s) used, sensor signals may be directly usable or may require processing of the three primitive signals measured by the sensors to obtain a clean decomposition of the measurement signals into independent "roll," "pitch," and "yaw" signals independently responsive to the "roll," "pitch," and "yaw" components of trackball rotation as is clear to one skilled in the art. It is also noted that the third component of rotation of the freely-rotating trackball may be interpreted or even measured as a discrete "click" event.

Similarly, a number of approaches may be used to obtain measurements for one, two, or three directions of non-rotational trackball displacement. For example, trackball 205 may be secured in saddle 415, typically attached in some manner to housing 410 (for example, mouse 200, 230, 260), allowing free rotation of trackball 205 but causing any displacement actions on the trackball to invoke displacements of saddle 415. The saddle displacement may be measured with displacement sensor 430 generating displacement signals 431. Displacement sensor 430 may comprise one or more pressure, optical, resistive, capacitive, magnetic, electromagnetic, continuous-range sensors, switches, etc. It is also noted that one or more components of displacement of the freely-rotating trackball may be interpreted or even measured as a discrete "click" event.

Figure 5A:
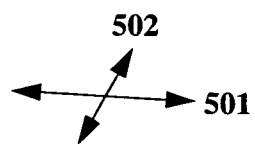
FIGS. 5a-5d depict various exemplary degrees of freedom that may be measurably assigned to a touchpad for interactively controlling parameters in a user interface.
Figure 5A:
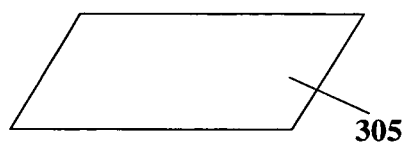

FIGS. 5a-5d turn now to the case of the touchpad. FIG. 5a illustrates touchpad 305 and the two principle orthogonal data entry directions 501, 502 that are responsively resolved and measured in traditional touchpad user interface devices. The touchpad shown in FIGS. 5a-5d, which provides at least four other physical degrees of freedom, may be implemented using the techniques presented in U.S. Pat. No. 6,570,078, for example.

Figure 5B:
Figure 5B:
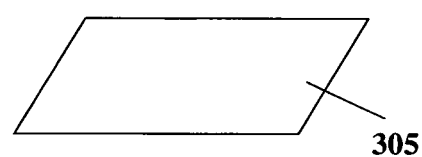
Figure 5C:
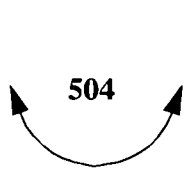
Figure 5C:
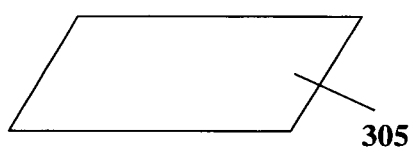
Figure 5D:
Figure 5D:
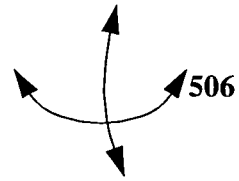
Figure 5D:
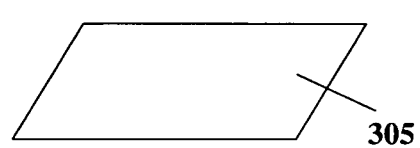

FIG. 5b illustrates the use of downward pressure 503 in the context of a touchpad. In contemporary touchpad interfaces, such as those found in laptop computers for example, such downward pressure 503 is sensed and utilized as discrete event "taps." However, downward pressure 503 may also be measured and adjusted as an independent and simultaneously interactive widely-varying parameter. Further, as illustrated in FIG. 5c, the rotational angle 504 of a finger contacting a touchpad with rough-elliptical contact boundary can also be measured as a widely-varying parameter. In FIG. 5d, both forward-backward 505 and left-right 506 components of the tilt of a contacting finger can additionally be measured as independent and simultaneously interactive widely-varying parameters.

The sensing of multiple fingers, the application of contact syntaxes and grammars, and other user interface control expansions of an adequately configured touchpad may also be achieved using, for example, the techniques presented in U.S. Pat. No. 6,570,078.

The invention also provides for larger numbers (i.e., more than two) of widely-varying adjustable parameters from other types of user interface sensor technologies. In the case of an X-Y joystick, the joystick may be configured to rotate on its axis, pulled in and out fitted with a knob or trackball, etc., in a measurable fashion to provide additional and simultaneous interactively adjustable parameters. In the cases of finger scroll-wheels and rotational knobs, three or more of these devices may be provided. When implementing video cameras, known techniques for the extraction of additional parameters may be used. Examples of the various types of video extraction techniques that may be used are presented in U.S. Pat. No. 6,570,078.

2.5 Non-Mouse User Interface Sensors

In one of its most abstract forms, the invention involves the incorporation of two conventional user interface sensors (such as a mouse, trackball, touchpad, joystick, etc.) into an embodiment where the user may freely use both of the user interface sensors individually or simultaneously with the same hand. As such, the invention provides for implementations that do not include a mouse as one of the user interface sensors. For example, two or more individual user interface sensors can be combined without need of a traditional hand-movable computer mouse. Such an implementation may be accomplished by implementing one of the possible user interface sensors in place of the traditional hand-movable computer mouse where taught in other descriptions of the invention. This configuration may be useful when built into a laptop computer, control console, musical instrument, and test instrument, among others.

In one exemplary implementation of a non-mouse embodiment, a trackball and touchpad may be arranged in the same physical enclosure so that the front, middle, or back of the palm may freely operate a conventional trackball while one or more selected extended or arching fingers may simultaneously or alternatively operate a touchpad. In this example, the touchpad may be a conventional touchpad providing two widely-varying simultaneously interactive parameters from a single finger contact, or the touchpad may be a more enhanced version providing as many as six widely-varying and simultaneously interactive parameters from a single finger contact. The touchpad may also be configured to accept multiple points of contact, recognize gestures, support syntax and grammatical constructions using, for example, the teachings provided by U.S. Pat. No. 6,570,078.

In another non-mouse implementation, two trackballs may be arranged in the same physical enclosure. In one possible arrangement, the two trackballs may be positioned so that they lie parallel to the length of the hand, enabling the front, middle, or back of the palm to freely operate a first trackball while one or more extended or arching fingers may simultaneously or alternatively operate the second trackball.

In another arrangement, the two trackballs may be positioned so that they lie parallel to the width of the hand, so that the fingers and/or thumb on the left side of the hand may operate a leftmost trackball while the remaining fingers and/or thumb on the right side of the hand may individually or simultaneously operate a rightmost trackball. In each of these arrangements, either or both of the trackballs may be a conventional trackball providing two widely-varying and simultaneously interactive parameters, or it may be a more enhanced trackball providing as many as six widely-varying and simultaneously interactive parameters as described earlier.

In addition to the just-described embodiments, alternative arrangements, such as the combination of a palm-operated trackball and a recessed joystick, and others, are also provided for by the invention.

2.6 Use of More than One Additional User Interface Sensor

Typically the arrangements of two non-mouse user interface sensors described above in Section 2.5 can also be applied to embodiments of the invention where a mouse user interface sensor is used. In such embodiments, a mouse user interface sensor is supplemented with at least two additional user interface sensors ergonomically arranged so that the two additional user interface sensors may be simultaneously or alternatively operated by the same hand. If these embodiments are further configured so the mouse body is readily moved with adequate precision via the back of the operating hand, then all three user interface sensors may be simultaneously or alternatively operated by the same hand in an ergonomically advantageous manner.

FIGS. 14a-14d illustrate some exemplary embodiments of the just-described features. FIG. 14a illustrates a mouse where traditional mouse buttons have been replaced by trackballs 1405a, 1405b. These trackballs 1405a, 1405b may accept a downward-pressure impulse and as such act as the traditional mouse buttons, However, trackballs 1405a, 1405b are also adjustable and each readily provides two or more additional widely-variable and simultaneously adjustable parameters in addition to the two parameters adjusted by moving the mouse body 1400.

FIG. 14b shows a similar arrangement where traditional mouse buttons have been replaced by touchpads 1435a, 1435b. If desired, these touchpads may accept a downward-pressure impulse and as such act as traditional mouse buttons, but are also adjustable as touchpads and as such each readily provides two or more additional widely-variable and simultaneously adjustable parameters. As described in Section 2.5, a single hand may be positioned to comfortably operate simultaneously or alternatively both trackballs or both touchpads. If these embodiments are further configured so the mouse body is readily moved with adequate precision via the back of the operating hand, then either of these embodiments readily provides six to twelve widely-variable and simultaneously adjustable parameters.

Other configurations are of course possible. For example, the configurations of FIGS. 14a and 14b may be blended as depicted in FIG. 14c, or in its mirror image. As another example, FIG. 14d illustrates a more extreme realization comprising a left-fingers/thumb trackball 1465a, a right-fingers/thumb trackball 1465b, a palm trackball 1465c, and a traditional clickable scroll-wheel 1468. Yet another alternative is to replace one or more of the trackballs of the FIG. 14d embodiment with a touchpad user interface sensor.

2.7 Incorporation of Visual Display and Auditory Output

If desired, any of the mouse and non-mouse embodiments may further include a visual display. The visual display may provide details of adjustable parameter values, operation modalities, etc. The visual display may be physically associated with a physical enclosure (such as that of a traditional computer mouse), or may be displayed on the computer screen or display of other associated equipment.

Alternatively or additionally, any of the mouse and non-mouse embodiments may further provide auditory output. The auditory output may provide details of adjustable parameter values, operation modalities, error conditions in usage of the invention, a condition relating to elapsed time or other metric of consistent use of a single usage modality, etc. The auditory output associated with the invention may be physically associated with a physical enclosure (such as that of a traditional computer mouse), or may be produced by speakers or headsets affiliated with the computer or other associated equipment.

2.8 Provisions for Field Installation or Replacement of Additional User Interface Sensor The invention also provides for the user interface sensor to be implemented using a replaceable module accepted by an adaptation of a traditional computer mouse. In this implementation a user may initially obtain the invention in one configuration and field-modify it to another configuration.

2.9 Implementation as a Module Removable from Affiliated Equipment

The invention also provides for a traditional computer mouse to be implemented as a removable module in a laptop computer or other affiliated equipment, and may include a wireless link with such devices. In particular, this removable module may further include one or more user interface sensors, with these sensors operable as a traditional trackball or touchpad when the invention is stowed in the laptop computer or other affiliated equipment in such a way that the invention's traditional hand-movable computer mouse modality is unmovable and hence unusable.

Figure 15:
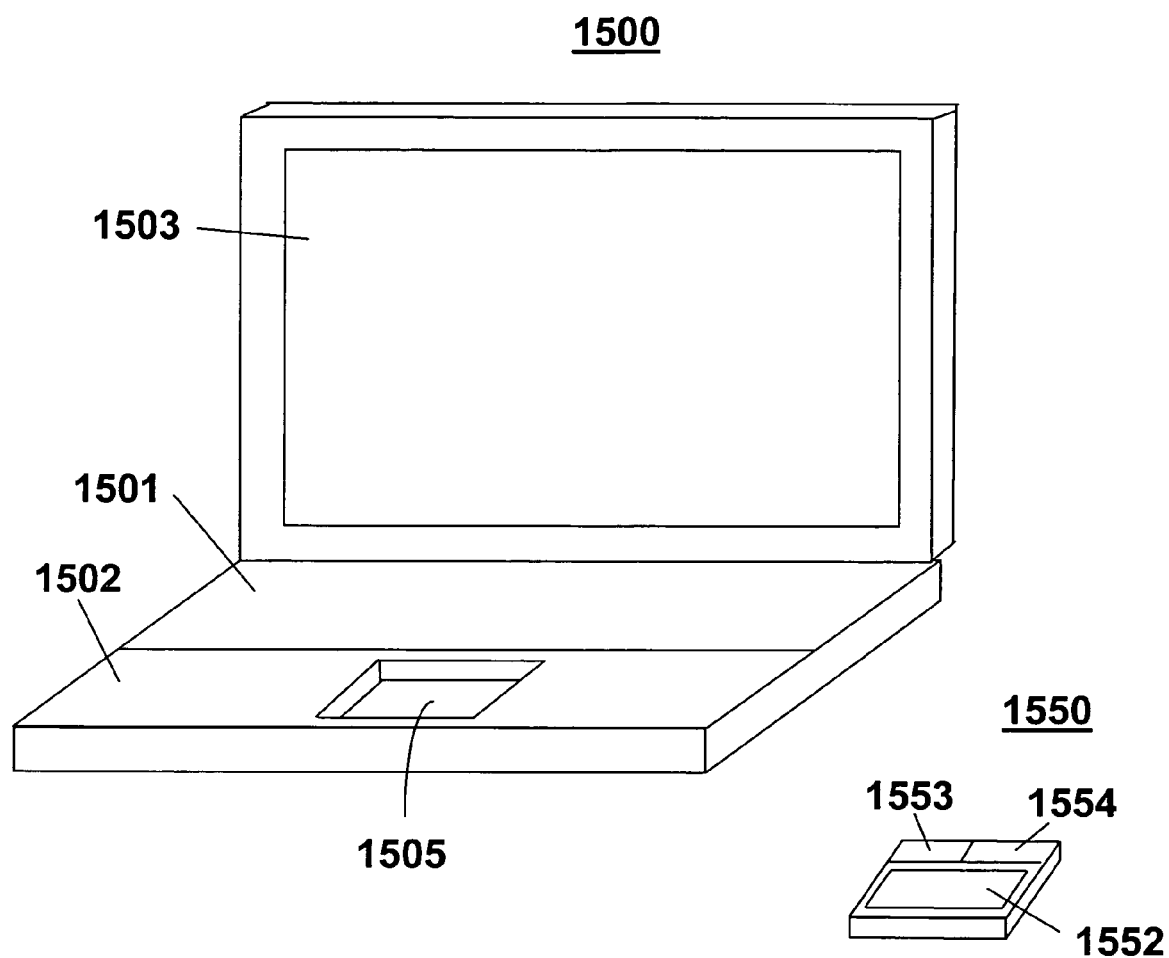
FIG. 15 shows an exemplary implementation of a removable mouse module for use in conjunction with a laptop computer.

FIG. 15 shows an exemplary implementation of a removable mouse module for use in conjunction with a laptop computer. The exemplary standard format laptop computer 1500 shown in the figure comprises a keyboard area 1501, a non-keyboard area 1502, as well as a screen area 1503 comprising an LCD, OLED, plasma, or other type of visual display. More specific to this exemplary implementation of the invention, the non-keyboard area 1502 comprises a cavity 1505 in the area which most contemporary laptop computers use an embedded touchpad. This cavity is such that it accepts, retains and locks into place the removable module 1550 which is shown here comprising a touchpad 1552 as well as buttons 1553, 1554. Other configurations, for example additional buttons, fewer buttons, a trackball or other user interface sensor in place of the touchpad 1552, different layouts of buttons and touchpads, different styling, etc. may be used as would be clear to one skilled in the art.

In the illustrated embodiment, the removable module 1550 operates at least as a traditional mouse when removed from the cavity 1505 and placed in a movable fashion on a sufficiently level surface. In this example the buttons may be usable in the same way regardless whether the removable module 1550 is secured within the cavity 1505 or removed from the cavity as depicted in FIG. 15. Similarly, the touchpad 1552 would be operable in the usual fashion when the removable module 1550 is secured within in the cavity 1505 and may be operable, disabled, or user-selectably disabled in types of various implementations when removed from the cavity 1505 and used as a traditional mouse, for example.

The removable module 1550 may transfer and/or exchange data with the laptop computer 1500 by either a wireless link or an electrical cable. If an electrical cable is used, the removable module may receive electrical power through this cable. If a wireless link is used, the removable module may include a rechargeable power source such as a battery, high-capacitance capacitor, etc. in which case recharging may be performed automatically when the removable module is reinserted into the cavity 1505. Alternatively, the removable module 1550 may internally include replaceable batteries. The removable module 1550 may additionally or alternatively include one or more photoelectric cells to provide power as is relatively commonplace in many contemporary calculators.

The wireless link between the removable module 1550 and the laptop computer 1500 may be optical, radio, etc. The "mouse" user interface sensor may be a rolling ball but may advantageously be implemented using optical mouse technology to facilitate reduced thickness of the body 1551 of the removable module 1550 in association with the required depth of the cavity 1505 and thickness of the closed laptop computer. It this example it is to be understood that in some applications the touchpad may not be needed and the removable module 1500 may only function as a traditional mouse when removed and placed on a surface. It this example it is also to be understood that the laptop computer 1500 can alternatively be any other type of equipment (test equipment, field instrumentation, control panels, service panels, etc.) benefiting from this removable module implementation.

Figure 16A:
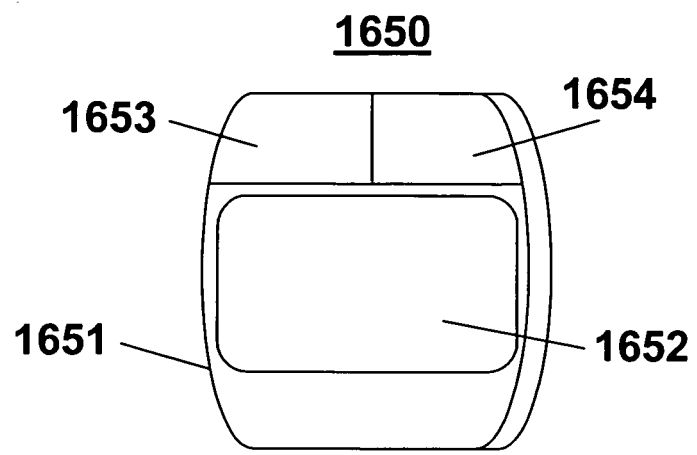
FIG. 16a shows a stylized version of a removable mouse module.

FIG. 16a shows an exemplary stylized version 1650 of a removable module aspect of the invention as described above. This version features a more rounded body 1651, and in keeping with the removable module 1550 of FIG. 15, again is illustrated comprising a touchpad 1652 and buttons 1653, 1654. However, other configurations, for example with additional buttons, fewer buttons, a trackball or other user interface sensor in place of the touchpad 1652, different layouts of buttons and touchpad, different styling, etc. may be used as would be clear to one skilled in the art.

Figure 16B:
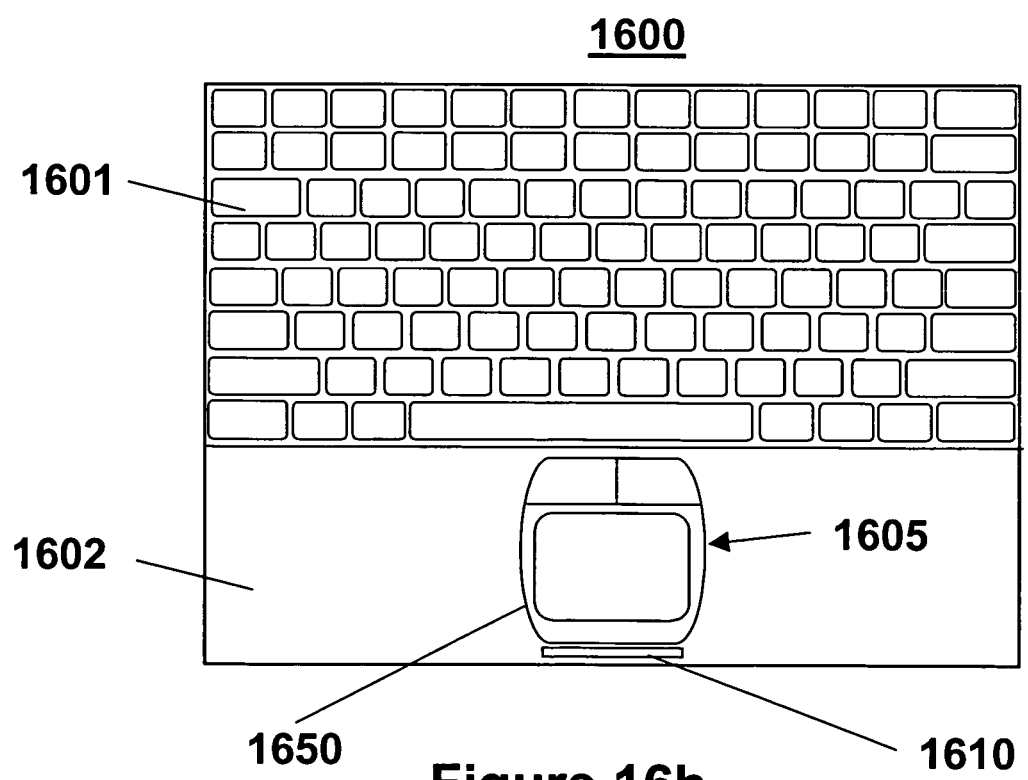
FIG. 16b shows the removable mouse module of FIG. 16a inserted into a laptop computer.

FIG. 16b shows an example of how the stylized removable module 1650 could be secured within an associated cavity 1605 (akin to the cavity 1505 depicted in FIG. 15) in the larger body of a laptop computer, control panel, etc. 1600. The laptop computer, control panel, etc. 1600 is shown here with a keyboard/control area 1601 and non-keyboard/control area 1602 in keeping with the laptop computer depiction of FIG. 15, but a wide range of other configurations are possible. The stylized removable module 1650 could be released for removal, or even appropriately ejected, from the cavity by operating a locking/release tap, button, lever, or switch 1610.

In FIG. 16b this locking/release tap, button, lever, or switch 1610 is shown at one edge of the body of a laptop computer, control panel, etc. 1600 but could be located elsewhere and take on other forms and sizes (rounded button, rotating lock, segmented numerical combination lock, a pair of buttons that must be operated simultaneously, etc.). Alternatively, the removable module 1650 could be released for removal, or even appropriately ejected, from the cavity under software control in response to keys, commands, combinations, passwords, etc. provided by keys, controls, etc. within the larger body of a laptop computer, control panel, etc., a remote control, keycard reader, etc. Under these circumstances the stylized removable module 1650 may be latched and released by electromagnetic, piezo, or other electromechanical means.

Figure 17A:
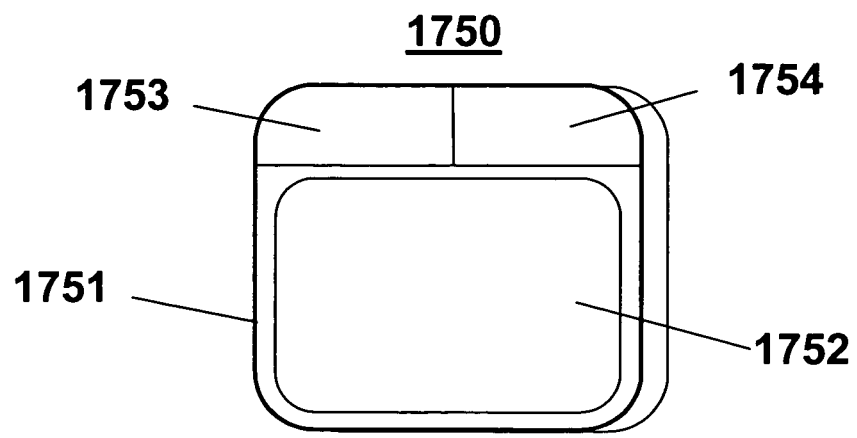
FIG. 17a shows another stylized version of a removable mouse module.

FIG. 17a illustrates another exemplary stylization 1750 of the removable module implementation aspect of the invention that is in keeping with the increasingly standard rounded-corner rectangular format 1751 for touchpads in contemporary Asian-manufactured laptop computers. Again, a touchpad 1752 and buttons 1753, 1754 are shown but other configurations, for example with additional buttons, fewer buttons, a trackball or other user interface sensor in place of the touchpad 1752, different layouts of buttons and touchpad, different styling, etc. may be used as would be clear to one skilled in the art.

Figure 17B:
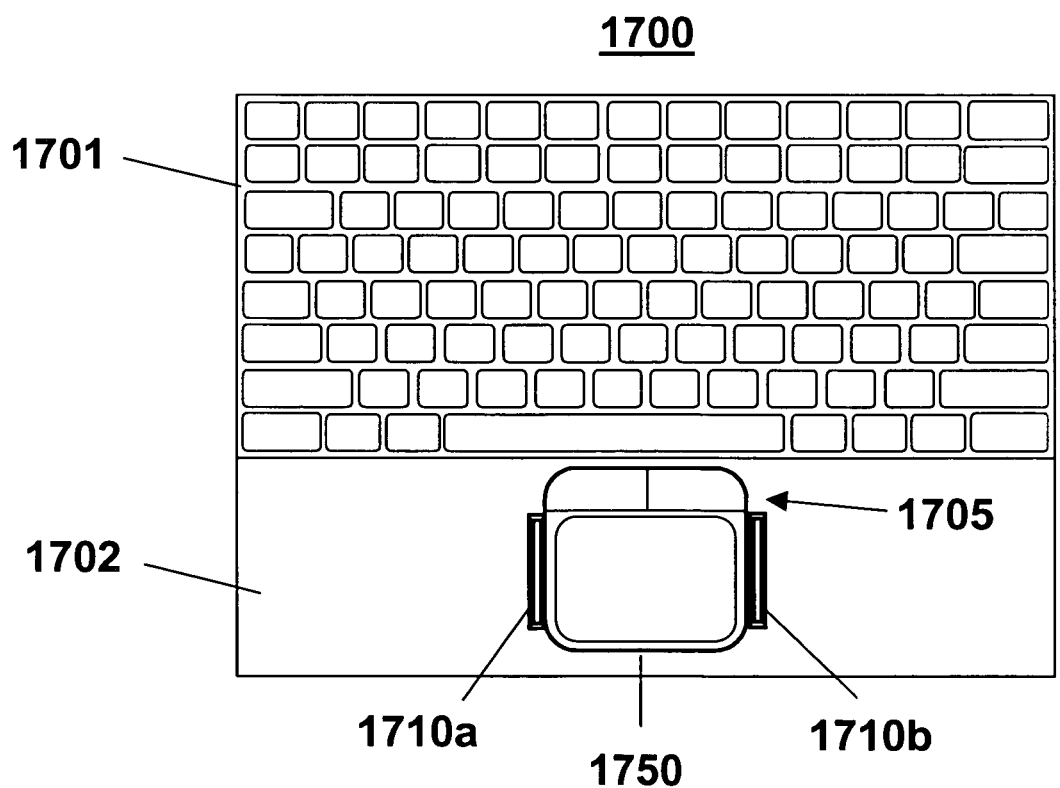
FIG. 17b shows the removable mouse module of FIG. 17a inserted into a laptop computer.

FIG. 17b shows an example of how the stylized removable module 1750 could be secured within an associated cavity (akin to the cavity 1505 depicted in FIG. 15) in the larger body of a laptop computer 1700. The laptop computer 1700 is shown having keyboard area 1701 and non-keyboard area 1702, although other configurations are possible. This stylized removable module 1750 could be released for removal, or even appropriately ejected, from the cavity 1705 by operating a exemplary two-element locking/release tap, button, lever, or switch 1710a, 1710b. Again, this locking/release tap, button, lever, or switch arrangement 1710a, 1710b could be located elsewhere and take on other forms and sizes (rounded button, rotating lock, segmented numerical combination lock, a pair of buttons that must be operated simultaneously, etc.), or alternatively, the removable module 1750 could be released for removal, or even appropriately ejected, from the cavity under software control in response to keys, commands, combinations, passwords, etc. provided by keys, controls, etc. within larger body of a laptop computer, control panel, etc., a remote control, keycard reader, etc. Under these circumstances the stylized removable module 1750 may be latched and released by electromagnetic, piezo, or other electromechanical means. It is noted that the latching mechanism, electrical configuration, and other aspects (such as the wireless link) may implemented in such a fashion that a composite module comprising the removable module 1750, the locking/release tap, button, lever, or switch arrangement 1710a, 1710b, and interface connections to the rest of the laptop computer 1700 may be configured so that said composite module exactly matches the said increasingly standard rounded-corner rectangular format for touchpads in contemporary Asian-manufactured laptop computers. With the resulting interchangeable electrical and mechanical characteristics, both new and existing laptop computers with touchpads of this contemporary Asian-manufactured style may be optionally fitted or readily upgraded to provide the removable module 1750 in place of the fixed touchpad.

3. Exemplary Applications

Figure 8:
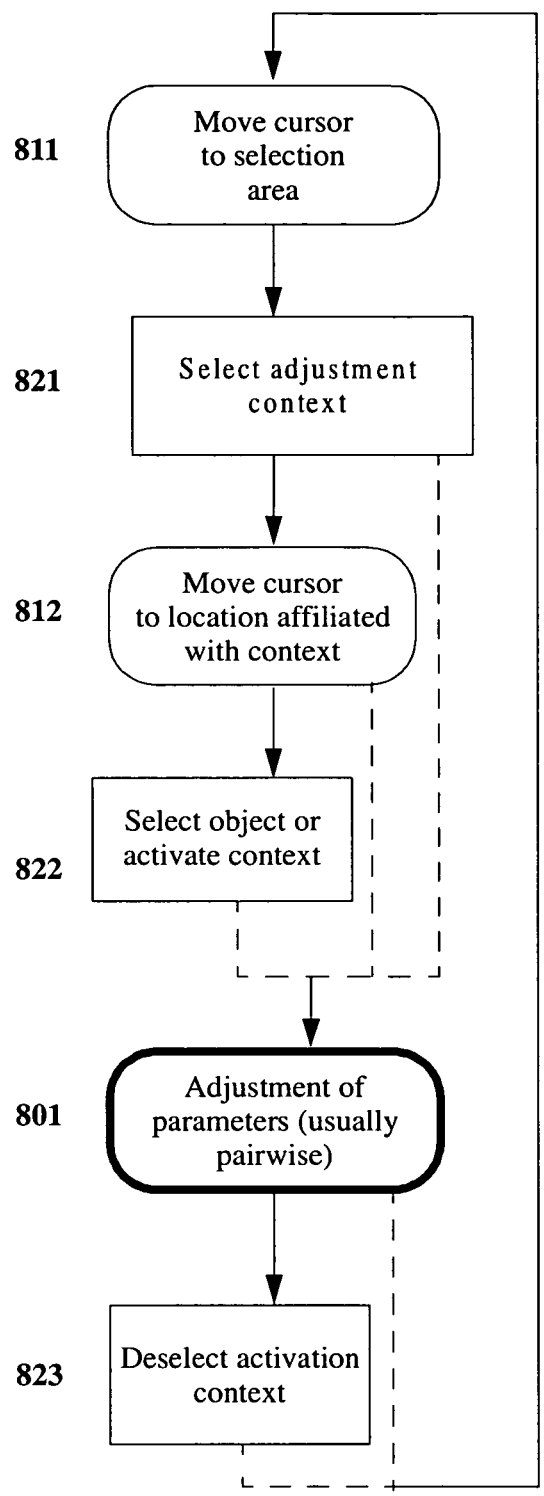
FIG. 8 is a flowchart showing exemplary operations and overhead involved in selecting and adjusting a specific pair of parameters from among a larger group of adjustable parameters.
Figure 9A:
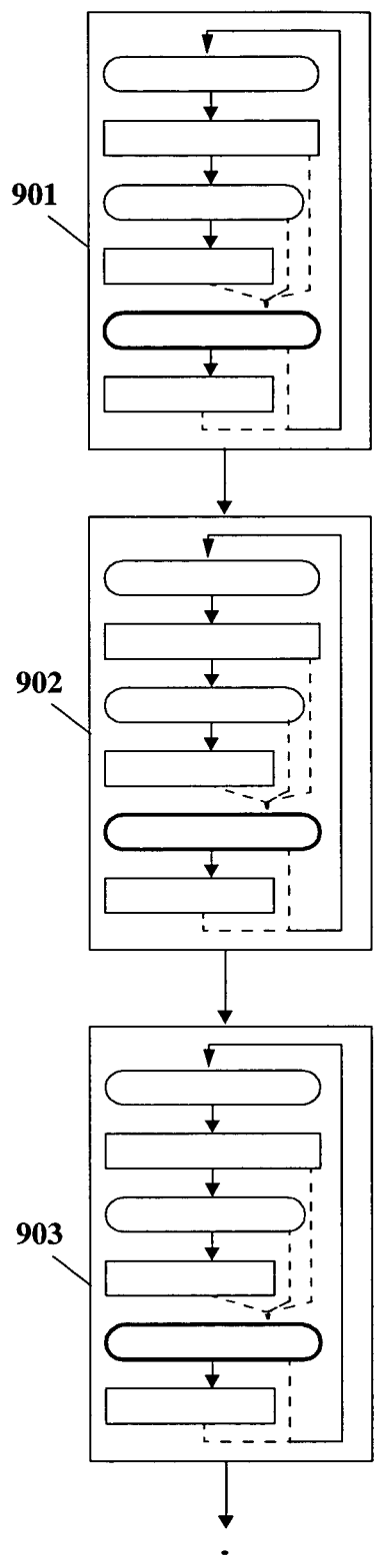
FIGS. 9a-9b illustrate how the exemplary operations and overhead depicted in FIG. 8 introduce excessive overhead in situations where many parameters with a larger group of adjustable parameters must be adjusted in pairs.
Figure 9B:
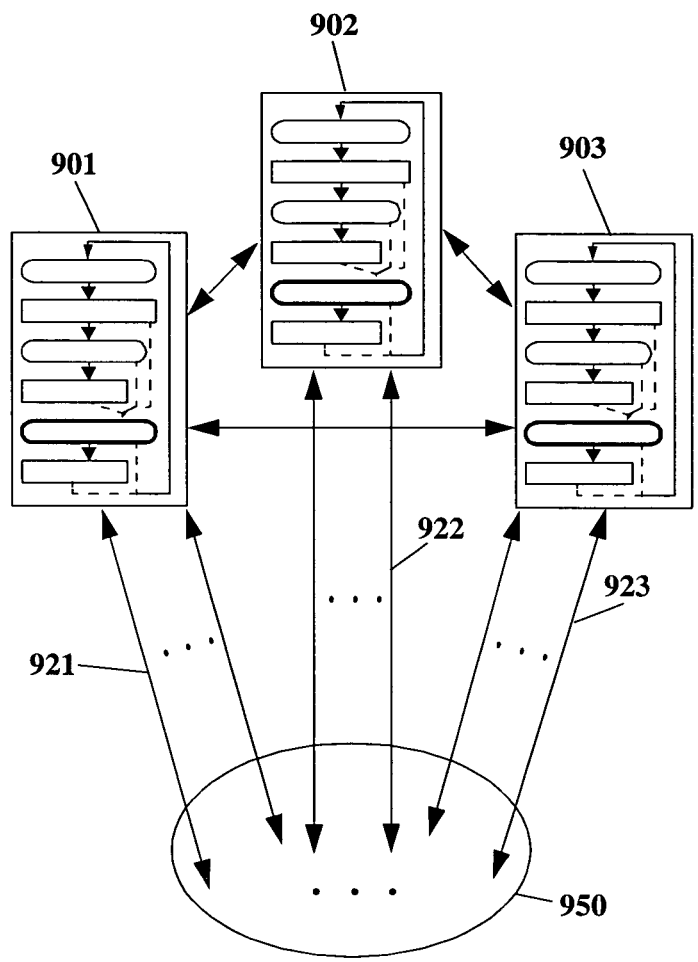

Departing now from the range of extreme realization and embodiments of the invention, attention is directed towards particular applications of the invention. A number of examples of various embodiments of the invention in a wide range of applications will now be presented. Many of these applications are viable with only the simplest physical embodiments of the invention (for example, those suggested by FIGS. 2a-2c and 3a-3c). In the discussion that follows, particular note is directed towards the discussion in Section 3.3 involving FIGS. 8 and 9a-9b. Although the discussion is motivated by a graphical layout application, the principles of the discussion in Section 3.3 involving FIGS. 8 and 9a-9b are very general, and the discussion illustrates the power of the invention for various applications in almost directly quantifiable terms.

3.1 Wrist/Hand/Arm-Fatigue Relief and Prevention Application

The danger and damage stemming from extensive continuous or mis-postured mouse usage to wrist, hand, and arms are sadly misfortunate and increasingly well recognized. As the present invention provides a plurality of different user interface sensors, it is well suited for use in responding to and preventing wrist/hand/arm fatigue due to overuse. In one exemplary implementation, user interface parameters can be interchangeably adjusted with either the movement of the mouse body or the use of an integrated trackball or touchpad with identical task results. Thus a user with a tiring hand can change at will the user interface sensor employed according to how the hand feels or the nature of a specific task. In addition, to prevent fatigue or injury, the user can also switch back and forth between moving the mouse body and using the trackball/touchpad either by free choice or by following auditory or visual prompting from a time or usage monitor.

3.2 Double-Scrollbar Application

Contemporary mice often feature a small rotating wheel between the buttons for use in operating the vertical scroll bar of a window without changing the position of the mouse. In one particular application of the invention, the left-right sensing capability of the trackball or touchpad may be used to add a similar capability for horizontal scroll bars of a window.

Figure 6:
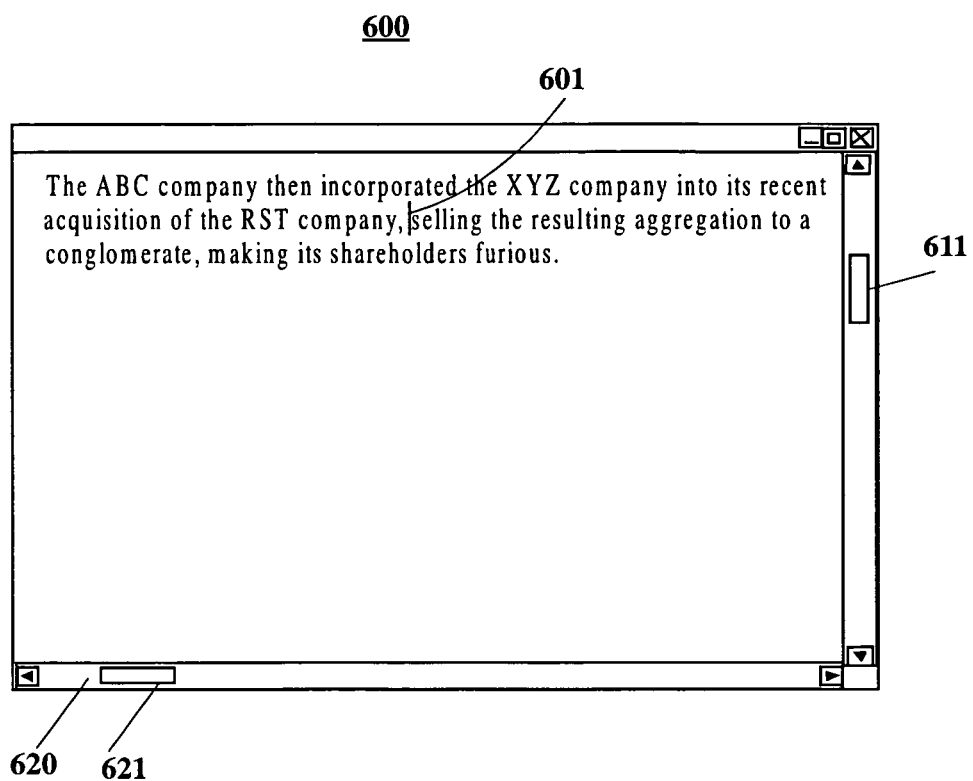
FIG. 6 depicts an exemplary implementation of the invention directed towards the control of both a traditional text cursor and a dual-scrollbar in a typesetting application.

In a trackball implementation, a user can move the vertical bar 611 of FIG. 6 up by rotating trackball 205 away from him/herself, or one can move the vertical bar 621 down by rotating trackball 205 towards him/herself. By rotating trackball 205 to the left, the user can move the horizontal bar 621 left. Similarly, the user can move the horizontal bar 621 right by rotating the trackball 205 to the right.

Figure 10A:
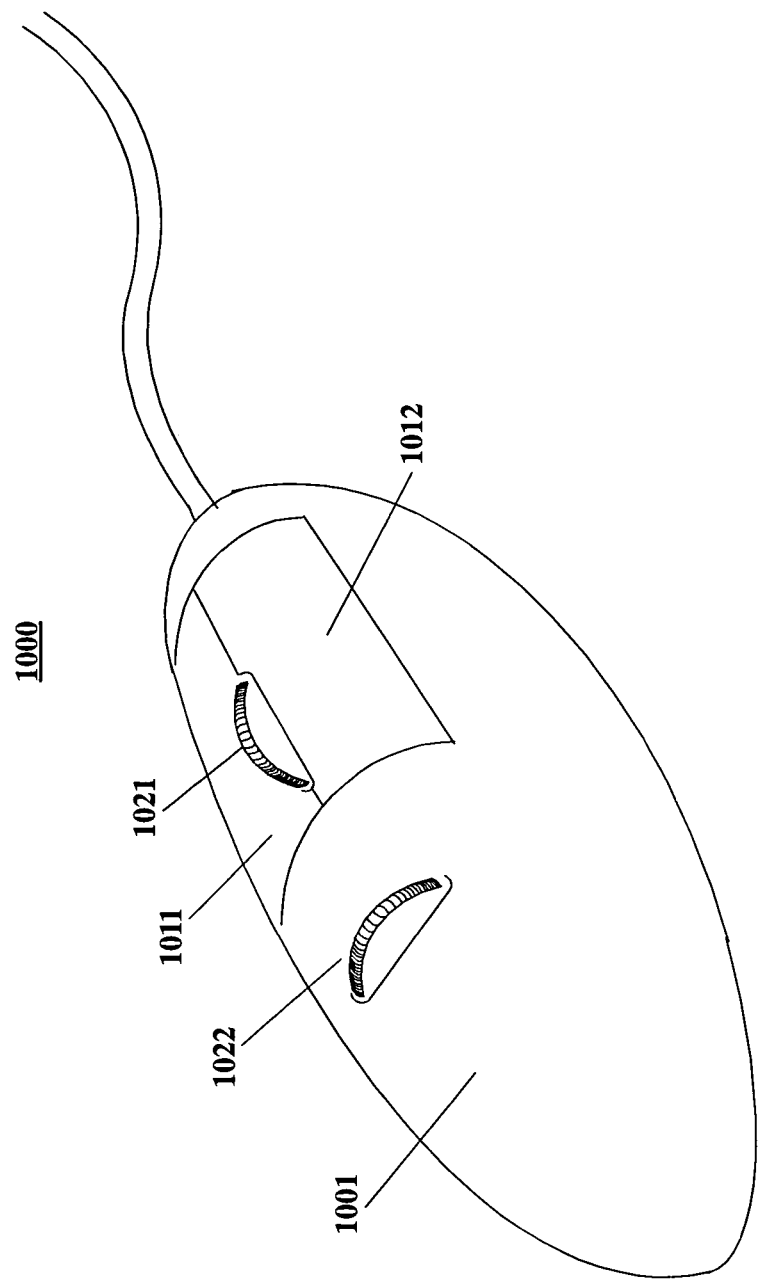
FIGS. 10a-10b illustrate one technique for adding an additional scroll-wheel to a conventional scroll-wheel mouse.
Figure 10B:
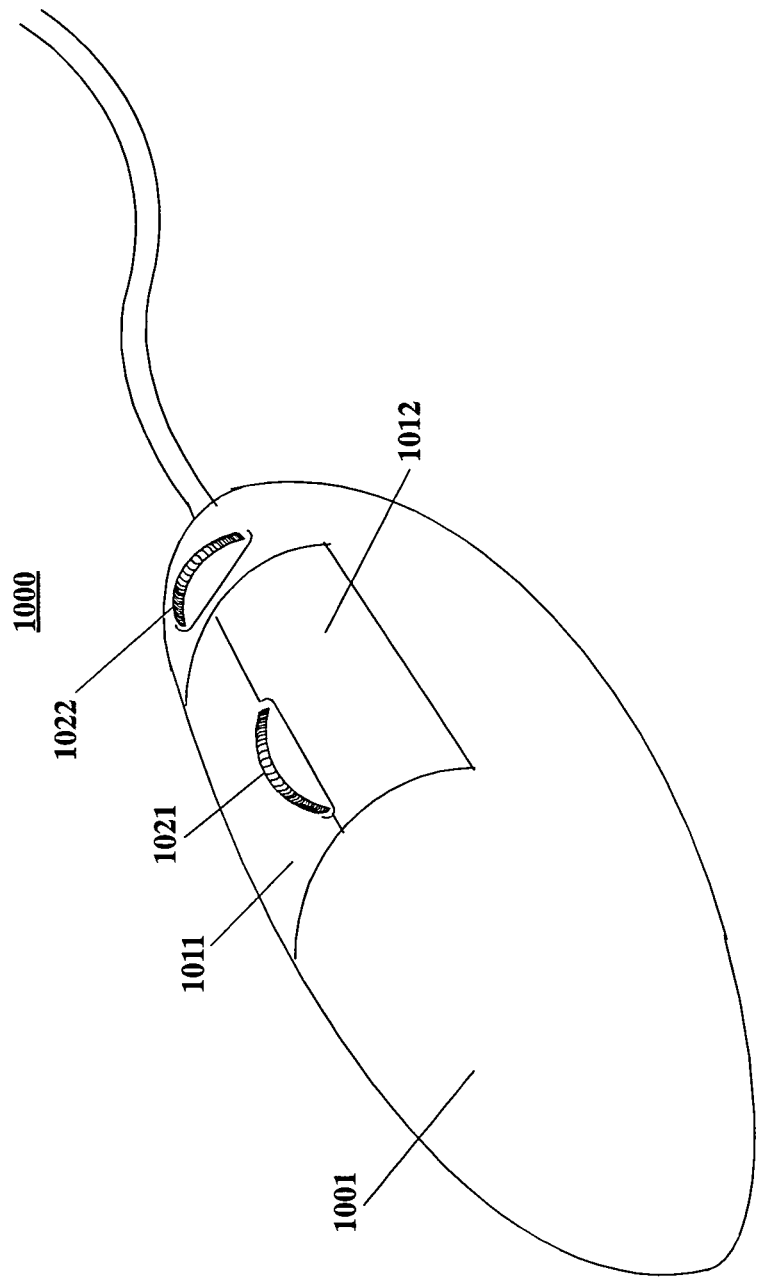

In a touchpad implementation, a user can move scroll bar 611 up by sliding the finger away from her/himself or move scroll bar 611 down by sliding the contacting finger towards her/himself; similarly, the user can move the scroll bar 621 left by sliding the finger to the left or move the scroll bar 621 right by sliding the contacting finger to the right. In another implementation, the vertical and horizontal scroll bars may be adjusted with a conventional scroll-wheel mouse that has been fitted with an additional scroll-wheel. FIGS. 10a and 10b depict exemplary embodiments 1000 of such an arrangement which comprise the usual components of a scroll-wheel mouse including mouse body 1001, buttons 1011 and 1012, and traditional scroll wheel 1021, with these components further complemented by an additional scroll wheel 1022 with adjustment direction perpendicular to that of finger scroll-wheel 1021. FIG. 10*a* illustrates an arrangement where the additional scroll-wheel is located closer to the user while FIG. 10*b* illustrates an arrangement where the additional scroll-wheel is located farther away from the user. In each of these arrangements, the two scroll-wheels are shown co-centered with respect to the mouse body; for simultaneous adjustment it may be advantageous to locate the additional scroll-wheel 1022 to one side or the other of the centered positions shown in FIGS. 10*a* and 10*b*. One approach useful for supporting both left-handed and right-handed users, which may provide additional utility, would be to provide two off-centered additional scroll-wheels, one on either side of the center line of the mouse body 1001 and conventional scroll-wheel 1021.

3.3 Traditional 2D Layout, CAD, and Graphics Applications

In most contemporary 2-dimensional layout and graphics applications, such as those commonly used for viewgraphs, page layout, electronic CAD, etc., numerous mouse operations are necessary for each of the many types of object attribute modification, etc.

Typically, these mouse operations are required because the mouse only allows for the interactive adjustment of two widely-varying parameters at a time, and the user must change context several times as the parameters adjusted by the mouse are chosen, adjusted, and then replaced with another pair of parameters. The present invention is useful in many of these circumstances because it allows for more than two parameters to be adjusted at the same time.

Figure 7:
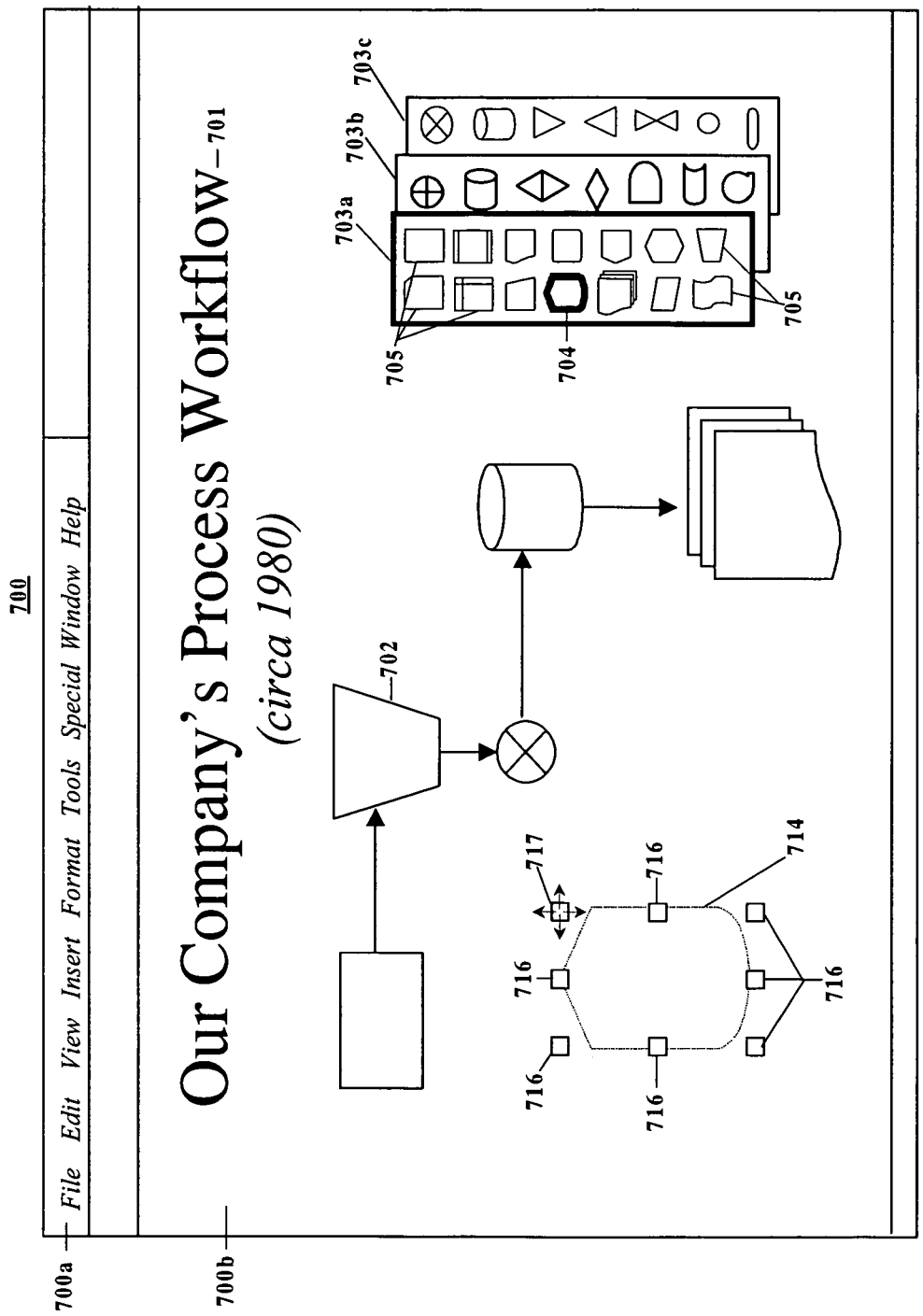
FIG. 7 depicts an exemplary implementation of the invention directed towards the active selection from a clip-art or symbol library and adjustment of positioning or other attributes of the active selection in a drawing or layout application.

FIG. 7 shows an example of a session involving the authoring of a viewgraph. The viewgraph authoring task showcased in this example includes the creation of a flowchart diagram (here depicting a business workflow process) and as such also illustrates related needs and attributes of a 2D CAD program involving layout of a diagram (such as a circuit, algorithm, etc.) or physical object (such as a PC board, control panel, semiconductor photolithography mask, etc.). In that this example further involves drawing, the example also illustrates the related needs and attributes of a paint-box or electronic drafting application.

In this broadly representative application, application window 700 is shown comprising menu area 700*a* and drawing area 700*b*. Within the drawing area, viewgraph title 701 and portion 702 of the flowchart to be drawn, comprising thus far a sequence of flowgraph objects connected by arrows, have already been entered and rendered. New flowgraph objects may be introduced in standard fashion by selecting the type of new object desired from a palette, initially putting an instance of the selected object type in a convenient place in the drawing area, adjusting the size, orientation, color, and/or other attributes, and putting into final position. Often a number of the last few steps are interactively cycled through multiple times before the newly introduced object is adequately drawn and the user directs their attention to the next task. In this example, the palette of available objects of a specific high-level task is shown as an overlapping stack of three sub-class palettes 703*a*, 703*b*, 703*c*, each providing a selection of available objects within that sub-class. Here, for example, sub-class pallet 703*a* has been selected (as indicated by the heavy line) from other available objects 705, within the sub-class pallet 703*a*. Upon selection, an initial highly adjustable rendering of a specific instance 714 of the selected object 704 appears in a convenient location, which may be selected by the user.

The specific instance 714, rendered in this highly adjustable initial state, is typically surrounded by graphical handles 716 which facilitate sizing, positioning within the drawing area, and often at least rotational orientation (for example, using the mouse with the ALT key simultaneously held down to interactively adjust the angle of rotation of the object should that be needed). Traditionally, the cursor controlled by the mouse 717 can be moved within object 714 to relocate it within drawing area 700*b* or can, as shown in FIG. 7, be positioned atop one of the graphical handles 716 to permit the mouse to adjust the horizontal and vertical scale of object 714, i.e., adjust its size and aspect-ratio. In some application packages, the latter adjustment is permitted to collapse the object through to 'zero' thickness in one of the adjustment dimensions and continue through to re-render the object in mirror image, thus additionally providing a form of vertical and horizontal flip by using the size and aspect-ratio resizing.

As familiar and widely accepted as these sorts of operations are, there is considerable overhead involved in such sequences of repeated selecting and adjusting (and in some cases additional deselecting) pairs of parameters from a larger collection of parameters. To see several aspects of the power of the present invention, these operations are now examined in more detail in generalized form.

FIG. 8 is a flowchart showing tasks involved in selecting and adjusting one of a plurality of available pairs of adjustable parameters by using a user interface device permitting the adjustment of only one pair of parameters at a time. In FIG. 8, the task goal is simply to adjust a pair of selected parameters 801 from a larger group of adjustable parameters. However, since a larger number of parameters are available for adjustment than are available at one time with the user interface sensor, the specific pair of parameters must first be selected. In most known graphical user interface systems and methods, this typically involves first using the user interface device to control the movement of a cursor to a selection area of the graphical interface in a first overhead step 811 and then selecting the adjustment context (parameter pair) in a second overhead step 821.

In some situations the selected pair of parameters may be immediately adjusted in goal operation 801, but typically the cursor must then at least be moved, in a third overhead operation 812, to a location outside of the selection area affiliated with operations 811 and 821 to another location (such as a drawing or typing area) affiliated with the context (parameter pair) that has just been selected for adjustment. In some situations the selected pair of parameters may be immediately adjusted in goal operation 801, but typically the context must be activated (for example, by clicking in an open portion of a drawing area or selecting an existing object) in a fourth overhead operation 822.

After the selected pair of parameters are adjusted (for example, by sizing a rectangle, etc.) the cycle may then immediately be repeated in some variant form for another pair of parameters, but typically the parameters must be deselected (for example, by another click to set the final value) in a fifth overhead operation 823 before the cursor may be moved to the selection area in another instance of operation 811. In summary, in order to adjust one pair of parameters from a larger group of parameters, as many as five overhead operations (as many as two cursor movements 811, 812 and as many as three select/deselect clicks 821, 822, 823) are commonly required.

FIGS. 9a-9b show broader implications of the overhead called out in FIG. 8. FIG. 9a depicts the sequential adjustment of pairs of parameters chosen from a larger group of pairs of parameters in a scenario suggestive of no interactive iteration. One pair of parameters is adjusted with up to five overhead operations in action 901, then a second pair of parameters is adjusted with up to five overhead operations in action 902, then a third pair of parameters is adjusted with up to five overhead operations in action 903, and so on. Here the overhead slows things down but may not be a significant encumbrance to the broader goal of actions 901, 902, 903, etc.

In contrast, FIG. 9b depicts an interactive adjustment of pairs of parameters from a larger group of parameters in a scenario suggestive of one where interactive iteration is required, as the setting of one pair of parameters is difficult to complete without setting other parameters. Here the overhead is likely a significant encumbrance to the higher goal involving the pair-wise adjustment actions 901, 902, 903, etc. For example, consider the interactive adjustment of six parameters, one pair at a time, through pair-wise adjustment actions 901, 902, 903: not only are up to five operations of overhead involved for each of the pair-wise adjustment actions 901, 902, 903, but a considerable extra number of passes must be made through these pair-wise adjustment actions 901, 902, 903 due to the fact that the adjustment of some parameters depends on or interacts heavily with the values of other parameters. The situation gets even more cumbersome should additional pair-wise adjustment operations be required. FIG. 9b further shows the potential for one or more additional adjustment actions 950 which in principle may be iterated as well as and combined with pair-wise adjustment actions 901, 902, 903 (as suggested by fully-connected iteration paths 921, 922, 923). In contrast to such sequences or iterative graphs of pair-wise adjustment actions, the present invention readily offers, for example, four, six, eight or even higher numbers of simultaneously adjustable parameters controllable by the same hand which, when selected in a context, eliminate the many overhead operations depicted in FIGS. 8 and 9a-9b, and the many additional iteration steps depicted in FIG. 9b.

Returning now to the generalized graphical layout situation described earlier and depicted in FIG. 7, the following operations are routinely performed in 2D graphics, layout, and CAD applications:
A. Selection of palette containing object;
B. Selection of object from palette;
C. Selection of "layer" object is to be assigned to (common in CAD, but typically not used in standard draw and paint packages);
D. Adjustment of object placement in drawing;
E. Adjustment of object sizing;
F. Adjustment of object rotation;
G. Adjustment of object line thickness(es);
H. Adjustment of object line color(s);
I. Adjustment of object fill color(s); and
J. Adjustment of object fill pattern(s);

Of these, operations B, D, and E are almost always utilized, operations A, G, and I are frequently utilized, and operations C, F, H, and J are rarely utilized.

Thus, in one exemplary application of the invention, it may be advantageous to group specific collections of operations that are commonly used together (this may be application-specific) so that the benefits of having four or more widely-adjustable interactive parameters simultaneously available can be applied to speed the execution of basic common operations. For example:

Employing a four-parameter version of the invention:
  Operation 1: Mouse for operation B
  Operation 2: Mouse for operation D, trackball or touchpad for operation E
Employing a six-parameter version of the invention comprising a 4-parameter touchpad:
  Operation 1: Mouse for operation B, touchpad finger-location for operation D, touchpad finger-tilt for operation E.
Employing a six-parameter version of the invention comprising a mouse and two trackballs or touchpads:
  Operation 1: Mouse for operation B, first trackball/touchpad for operation D, second trackball/touchpad for operation E.
Other operations can be later applied in groupings and operations appropriate for the application.

As a possible alternative to the preceding example, it may be advantageous to assign a principal one of the user interface sensors to the sequential adjustment of each of such universal (or otherwise principal) operations and reserve the additional user interface sensors for rapid "in-context" interactive access to less frequently used operations. For example:

Employing a four-parameter version of the invention:
  Operation 1: Mouse for operation B, trackball or touchpad for operation A and/or operation C;
  Operation 2: Mouse for operation D, trackball or touchpad for operation E and/or operation F;
  Operation 3: Mouse for operation G, trackball or touchpad for operation H; and
  Operation 4: Mouse for operation I, trackball or touchpad for operation J.
Employing a six-parameter version of the invention comprising a 4-parameter touchpad:
  Operation 1: Mouse for operation B, touchpad finger-location for operation A and touchpad finger-tilt for operation C;
  Operation 2: Mouse for operation D, touchpad finger-location for operation E and touchpad finger-tilt for operation F;
  Operation 3: Mouse for operation G, touchpad finger-location (and touchpad finger-tilt as useful) for operation H; and
  Operation 4: Mouse for operation I, touchpad finger-location (and touchpad finger-tilt as useful) for operation J.
Employing a six-parameter version of the invention comprising a mouse and two trackballs or touchpads:
  Operation 1: Mouse for operation B, first trackball/touchpad for operation A and second trackball/touchpad for operation C;
  Operation 2: Mouse for operation D, first trackball/touchpad for operation E and second trackball/touchpad for operation F;
  Operation 3: Mouse for operation G, first trackball/touchpad (and second trackball/touchpad as useful) for operation H; and
  Operation 4: Mouse for operation I, first trackball/touchpad (and second trackball/touchpad as useful) for operation J.

As another alternative example, the user may freely assign user interface sensor parameters to operations A through J (and others as may be useful) for each of a number of steps as may match the task or tasks at hand. These assignments may be stored for later retrieval and use, and may be named by the user. The stored assignments may be saved along with specific files, specific applications, or as a general template the user may apply to a number of applications. It is noted that such variable assignments may be particularly useful to users as their hands fatigue, to prevent fatigue or injury, or as an adjustment for a temporary or permanent disability.

3.4 Multi-Resolution Mouse Application

In another exemplary family of applications, one user interface sensor (for example, the mouse body) is used for course adjustment or fine adjustment of user interface parameters, while the additional user interface sensor (for example, a trackball or touchpad) is used for the remaining level of parameter adjustment resolution.

In most user-interface applications it is advantageous to have multiple scales of graphical user interface pointing and data entry. Many window systems provide an 'acceleration' setting which changes the pointing and data entry values on a more significant scale used for user interface changes made less frequently. Many applications further internally adjust the resolution as the corresponding visual display is "zoomed" in and out.

In many user interface applications, additional levels of resolution selection may be useful. For example, in pointing usage in text work, multiple resolutions would be advantageous in amending fine print or in making isolated changes in thumbnail overviews of 40% actual size or less. Similarly, in graphics work, fine resolution may be especially useful in making fine adjustments to figures. In the fine adjustment of figures, it may be further advantageous to employ each of the separate user interface sensors in conjunction with corresponding snap-grids of differing grid spacing, particularly if one of the grid spacings is a sub-multiple of the other. A potentially useful extension of this would be to impose locally-applicable grid spacing on individual graphic or other objects, particularly objects which have been resized and hence for which the standard snap-grid spacing is no longer useful.

In a further application, the user interface may be directed towards non-positional adjustments, such as the adjustment of a rotation angle or of the color of a graphic object; here multiple resolutions may be valuable to make careful adjustments and coarse adjustments as needed. Similarly, scroll bars for long documents may also benefit from rapid access to multiple resolution scales, for example one user interface sensor may be used to navigate within a page (using a fine-grained navigation scale) while a second user interface sensor may be used to navigate across pages (using a coarser-grained navigation scale).

3.5 Provision of Both Absolute and Relative Positioning

As discussed earlier, some types of user interface sensors, such as the touchpad and X-Y joystick for example, naturally have a limited maximum range of operation while others such as a mouse, trackball, and scroll-wheel have an essentially unlimited maximum range of operation. Although most user interface sensors are interpreted in relative terms (that is, the stimulus from the sensor is interpreted as a command to move a cursor, scroll bar, etc., incrementally in some direction relative to a current position), stimulus signals from any of these types of user interface signals may be interpreted in either a relative or absolute manner with varying degrees of naturalness or problematic qualities.

The present invention provides for one user interface sensor to be used for absolute positioning of a cursor, scroll bar, etc., or other means of parameter adjustment while another user interface sensor is used for traditional relative adjustment of such parameters. For example, a scroll bar may be adjusted in the usual fashion by a mouse body or trackball and in an absolute manner by a touchpad wherein the extreme values of the adjusted parameter correspond to the extreme positions at the edges of the touchpad. In one embodiment or application setting these two user interface sensors may control the same parameters—here it is often the result that the two sensors adjust the same parameters with different resolutions. Further, in this situation it is fairly likely that at least one of the resolution scale factors will be adjusted automatically. For example, in a document editor, as the number of pages of the document varies, the resolution of the absolute positioning sensor will correspondingly vary (so that the extremities in range of, for example, a touchpad correspond to the top of the first page and end of the last page) while the relative positioning sensor may retain the same incrementing/decrementing vertical scrolling resolution scale regardless of the number of pages.

3.6 Color-Selection Application

In color adjustment, three parameters are involved in the full interactive span of any complete color space (RGB, HSB, YUV, etc.). By adding additional parameters to the overall user interface, all three parameters can be adjusted simultaneously rather than simply two at a time. As the present invention provides at least four simultaneous interactively adjustable parameters overall, it is thus potentially useful for fully interactive color adjustment within a complete color space model. Further, should the additional user interface sensor be such that it alone provides three simultaneously interactively adjustable parameters, the first user interface sensor (for example, the mouse body) may be used as a pointer to select objects and the additional user interface sensor may be used to adjust attributes of the selected object such as its color, border color, etc.

3.7 Multi-level Graphic Object Grouping and Editing Application

In many drawing applications, lower-level graphical or other objects (such as lines, basic shapes, and text areas) may be grouped to form an aggregated object. This aggregated or "grouped" object (collectively referred to herein as an "aggregated object") can then be moved, rotated, flipped, resized, etc. as if it were a lower-level graphic or other object. Grouping can also typically be done hierarchically and in mixed hierarchies, i.e., a plurality of lower-level graphical or other objects may first-be grouped, and-the resulting aggregated object may then itself be grouped with other aggregated objects and/or lower-level graphical or other objects.

Often one or more of the lower-level graphical or other objects comprising the aggregated object may need modification. In the case of text, most applications permit modifications to be made to individual text objects within an aggregated object. However, for any isolated adjustment to any other lower-level graphical or other object the aggregated object must be first disaggregated or "ungrouped" to completely free the involved lower-level graphical or other object from any grouping it had been involved in. After the modification, the grouping must be reconstructed. Often this becomes a cumbersome situation, particularly where the adjustments within the group are themselves an interactive response to other adjustments made within a drawing.

The additional number of widely-adjustable simultaneously interactive parameters made possible by the invention may be advantageously applied to this problem. For example, one user interface sensor may be used to navigate the levels of grouping and another user interface sensor may be used to perform operations on objects (lower level or "grouped") within that level of grouping of the overall aggregated object.

Figure 11A:
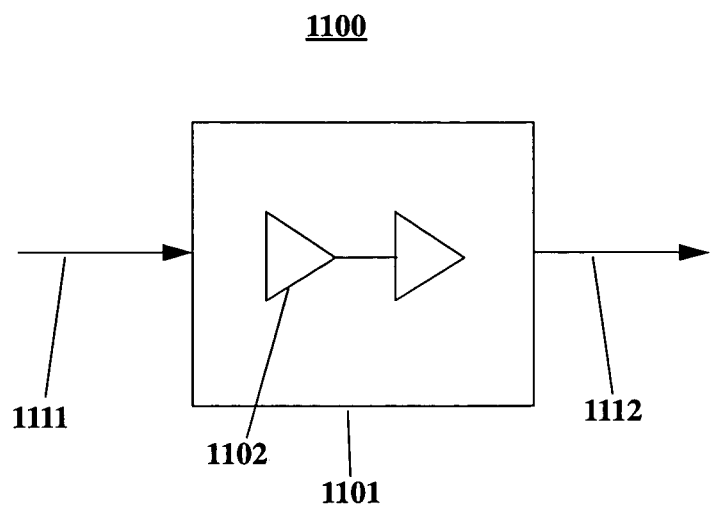
FIGS. 11a-11b illustrate a simple example of open adjustments being made within various levels of hierarchy of graphical object groupings.
Figure 11B:
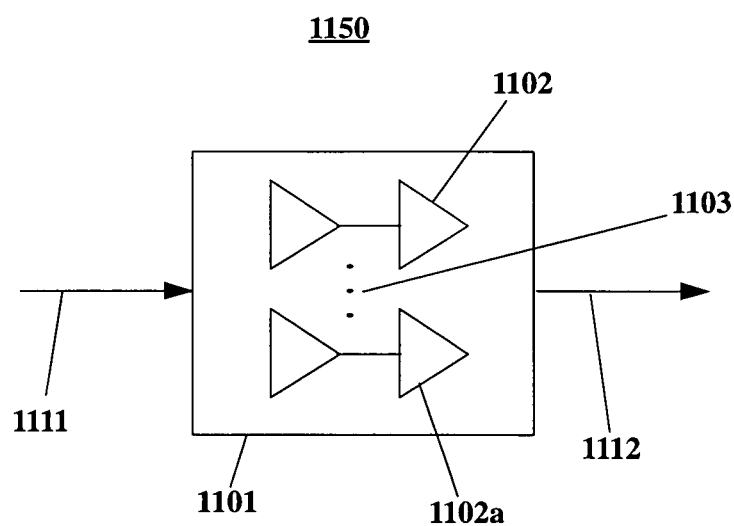

As an illustrative example, FIG. 11a shows a portion 1100 of a larger drawing, the portion 1100 featuring box 1101, two arrowed lines 1111, 1112, and grouped object 1102 (here itself comprising two triangles connected by a line). In this example it is given that grouped object 1102 is itself grouped with box 1101 to form a second grouped object, and this second grouped object is itself grouped with the two arrowed lines 1111, 1112 to form a third grouped object. The user's task is to modify FIG. 11*a* so that it becomes FIG. 11*b*. To do this, effectively the user must, in some order of operation:

- Reposition grouped object 1102 from its original position in FIG. 11*a* to a new position in FIG. 11*b*;
- Copy or otherwise reproduce grouped object 1102 to create an accompanying grouped object 1102*a*, and position it within box 1101;
- Introduce a vertically distributed ellipsis 1103 and position it within box 1101—typically, a vertically distributed ellipsis 1103 is either rotated text or itself a fourth grouped object created from three aligned text elements; and
- Ensure elements 1102, 1102*a*, and 1103 are in the end grouped with box 1101 to form the second grouped object, and this second grouped object is itself grouped with the two arrowed lines 1111, 1112 to form a third grouped object.

Utilizing the invention, one user interface sensor is used to select the second group level, and the second user interface sensor is used to perform insert, copy, paste, and position operations within this level of grouping without any form or type of ungrouping operation. If the vertically distributed ellipsis 1103 itself is realized as a fourth grouped object created from three aligned text elements, when it is pasted into the drawing via this modality its 1103 grouping is subordinated appropriately (i.e., structured as a peer to grouped objects 1102, 1102*a*) within the second grouping level.

Although readily implemented using the novel user interface sensors described herein that make it particularly easy to simultaneously adjust a plurality of pairs of parameters, the aspects of the invention illustrated here can also be implemented with a conventional user interface sensor such as a traditional mouse, trackball, or touchpad. In this case, the conventional user interface sensor such as a traditional mouse, trackball, or touchpad must first be used to select the level of grouping and then be used to make the desired modifications within that level of grouping; to make modifications at a different level of grouping, the new level of grouping must be selected in a separate operation, thus adding overhead, as depicted in FIGS. 8 and 9*a*-9*b*. Although this novel ability to move and modify arbitrary graphic or other objects within groupings may be implemented in this way, having an additional number of widely-adjustable simultaneously interactive parameters—made possible by the main themes of the present invention—is clearly more efficient, as many or all of the overhead operations depicted in FIGS. 8 and 9*a*-9*b* can be eliminated via usage of the additional widely-adjustable simultaneously interactive parameters.

3.8 3D Graphic Object Placement and Orientation Application

Figure 12:
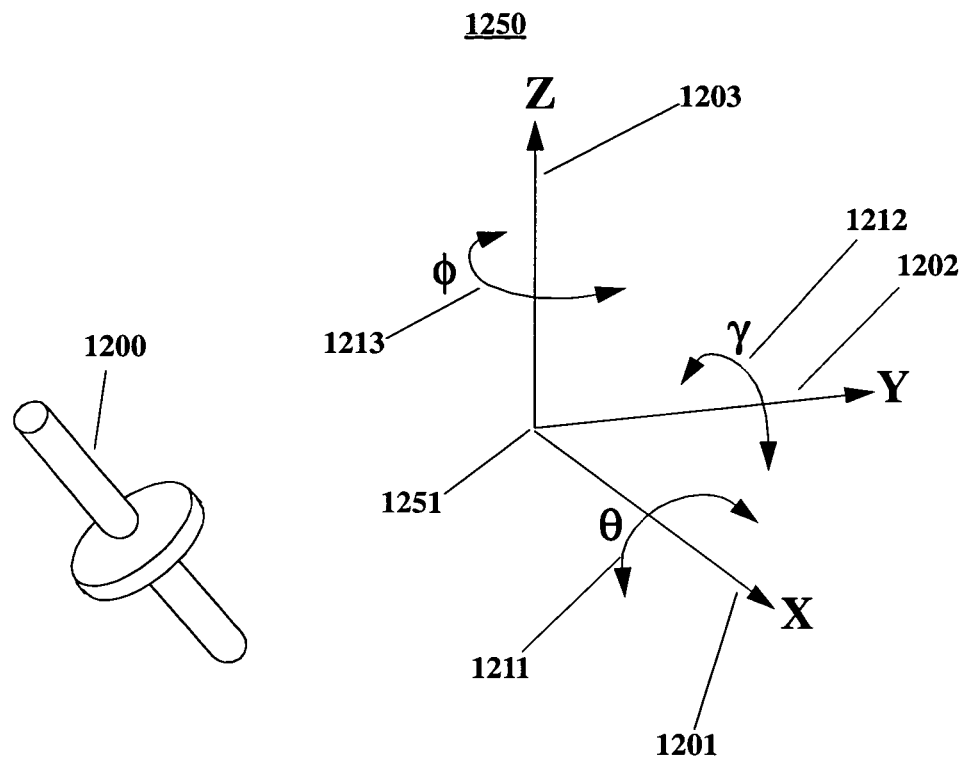
FIG. 12 illustrates aspects of the 3D orientation of an object in 3-dimensional space, and in particular the three coordinates of position and the three angles of rotation.

CAD and drawing packages that enable 3D object placement and orientation within a 3D space typically extend the capabilities of traditional 2D layout, CAD, and graphics applications as described in Section 3.3 to serve additional geometric needs. As illustrated in FIG. 12, the placement and orientation of 3D object 1200 within a 3D space 1250 (oriented with respect to a reference point 1251) requires that one additional position dimension and two additional orientation angles be specified to complete the full collection of three position dimensions 1201, 1202, 1203 and three orientation angles 1211, 1212, 1213.

To interactively adjust these parameters pairwise (or individually with a knob box as has been done historically in some systems) involves complex repetitive passes among high-overhead operations as depicted in FIGS. 9*a*-9*b*, for example among steps 901, 902, 903. The necessity of making many high-overhead operations, for example moving among steps 901, 902, 903, can be functionally disruptive as well as slow and inefficient. The ability to interactively freely adjust the full collection of three position dimensions 1201, 1202, 1203 and three orientation angles 1211, 1212, 1213 is thus of extremely high value.

The invention provides for a wide range of mappings between the six position and orientation parameters 1201, 1202, 1203, 1211, 1212, 1213 involved in the placement and orientation of 3D object 1200 within a 3D space, and the large numbers of widely-adjustable and simultaneously interactive parameters facilitated by various realizations of the invention. As one example, a mouse fitted with two trackballs as in FIG. 14*a* may be used to specify these six parameters in various ways. One technique is to use the position of mouse body 1400 to control two of the position coordinates (for example 1202, 1203), one of the trackballs (for example 1405*a*) to control the orientation angles (1212, 1213) corresponding to these two axes, and the remaining trackball (1405*b*) to control the remaining axis (1201) and its corresponding orientation angle (1211). In this example, trackballs 1405*a*, 1405*b* are configured or used in 2-parameter modalities.

In another example, the mouse of FIG. 14*a* is fitted with two trackballs, the trackballs may be configured in 3-parameter modalities with one of the trackballs used for controlling three position dimensions 1201, 1202, 1203 and the second trackball configured to correspondingly control the three orientation angles 1211, 1212, 1213. Here the position of mouse body 1400 may be used to control other aspects of drawing operations.

In another implementation, a touchpad configured for 4-parameter operation involving two parameters of finger position and two parameters of finger tilt may be combined with a trackball configured for 2-parameter operation. In this example, finger position may be used to control two of the position coordinates (for example 1202, 1203), finger tilt may be used to control the orientation angles (1212, 1213) corresponding to these two axes, and the trackball to control the remaining axis (1201) and its corresponding orientation angle (1211). If the configuration includes a mouse body, its position may be used to control other aspects of drawing operations.

In another example, a configuration like that of FIG. 14*d* may use left-fingers/thumb trackball 1465*a* to control a first position coordinate 1201 and its corresponding orientation angle 1211, the right-fingers/thumb trackball 1465*b* to control a second position coordinate 1202 and its corresponding orientation angle 1212, and palm trackball 1465*c* to control third position coordinate 1203 and its corresponding orientation angle 1213.

The invention further provides for a wide range of additional mappings and geometric metaphors between the user interface sensor geometry and the three position dimensions 1201, 1202, 1203 and three orientation angles 1211, 1212, 1213 of a 3D object.

3.9 Multiple Cursors and Cut and Paste Application

The invention additionally provides for a plurality of pairs of user interface sensor parameters to be used to control the respective positions of a corresponding plurality of individual cursors, selections, and/or insertion points. Multiple cursors and associated operations of multiple selection and insertion points can have many applications. Below, a few of these possibilities that would be apparent to one skilled in the art are showcased in a cut-and-paste editing example.

Figure 13A:
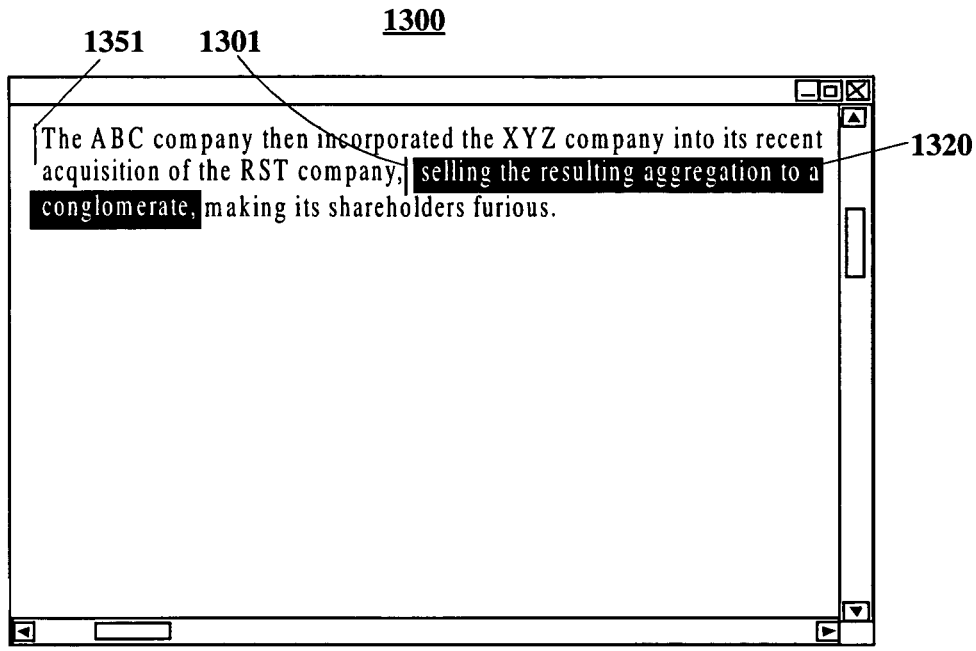
FIGS. 13a-13b illustrate one technique for using two cursors in a text cut-and-paste operation.

Cut, copy, and paste operations using traditional user interface devices usually involve multiple operations to switch between contexts introducing considerable overhead as depicted in FIGS. 9a-9b and 8. For instance, FIG. 13a illustrates a text editing example with text display window 1300 involving the selection of a clause 1320 (highlighted in this example) with the intention of relocating it to a new position 1351. In such an operation with a traditional 2-parameter mouse/trackball/touchpad user interface, the cursor is first used to select clause 1320 and then used to select the insertion position 1351.

When writing or editing it is often the case that material needs to be fetched from elsewhere and put in the spot where one is currently writing. Here, the cursor is initially in the spot where the insertion is to occur and the user must then lose the cursor position currently set in this spot to go searching and then to select and cut or copy the material to be pasted; following this the user must then search again, perhaps taking considerable time, for said initial spot and re-establish the cursor location there. Equally often there are other situations where material must be split up and distributed in a number of far-flung places. Here, the cursor is initially in the spot where the material to be sequentially divided and relocated is originally aggregated; the user must repeatedly select the portion of the remaining aggregated material to be relocated and then lose that cursor position to go searching for the new destination insertion spot, perform the insertion, and then search again, perhaps taking considerable time, for the initial spot and re-establish the cursor location there. In both of these cases it would be advantageous if the user could "bookmark" an initial cursor location, search and perform the desired fetch or relocation operations, and readily return without search to the "bookmarked" location. Although this novel and advantageously valuable capability could be realized with a conventional mouse through context redirection operations involving the steps depicted in FIGS. 8 and 9a-9b, the present invention provides for a wide range of readily realized and easy-to-use implementations.

Figure 13B:
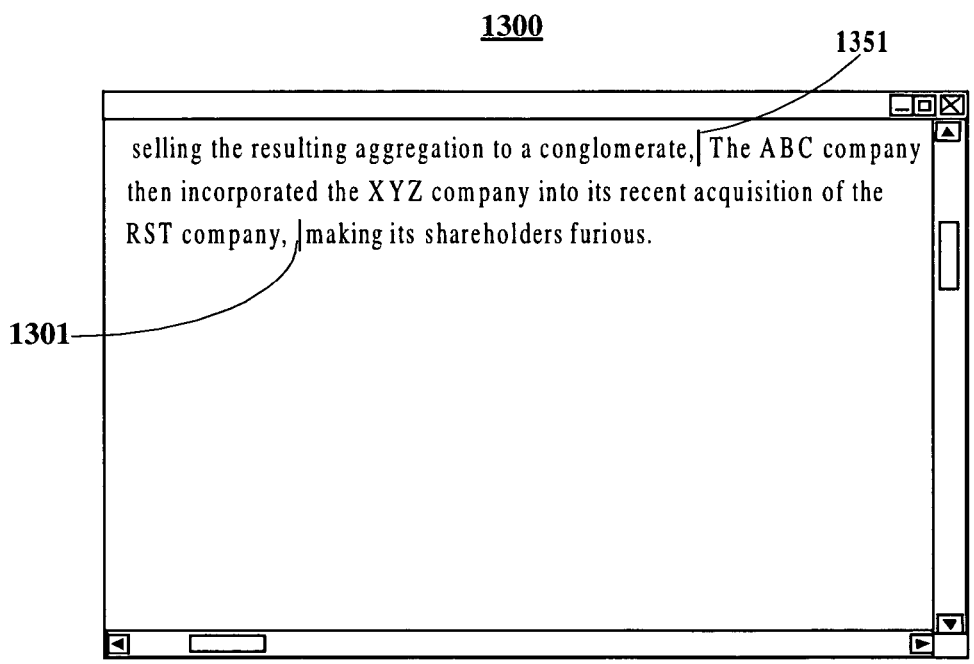

The invention may be used in a minimal configuration capable of interactively specifying at least two pairs of widely adjustable interactive parameters. Returning to the specific example associated with FIG. 13a, one pair of parameters is used to set the location of first cursor 1301 which is used in a selection operation, while the second pair of parameters is used to set the location of second cursor 1351 which is to be used to independently set an insertion point. The user may then perform the cut and paste operation with a single mouse click, resulting in the outcome depicted in FIG. 13b. The relocated text clause 1320 has been transferred to a position determined by the insertion cursor 1351 (here shown to the left of the cursor 1351; it could just as easily be to the right of it), and cursor 1301 used to make the selection remains in position. Either cursor 1301 or 1351 may now be moved and/or used for other cut, copy, paste, or (via the keyboard) new text insertion operations.

Although in this example the two cursor locations were close enough to be displayed in the same window 1300, the value of this application of the invention is significantly increased should the two positions be separated by many pages, many tens of pages, or even many hundreds of pages of text. Such situations may be handled by any number of approaches as is clear to one skilled in the art. In one approach involving a single display window, the area comprising the cursor whose corresponding user interface sensor was last manipulated is displayed in the single display window. In another approach involving a single display window, a click event or other user interface stimulus may be used to toggle among the areas comprising the various cursor locations. In yet another approach, at least two windows may be rendered, with one of the cursors displayed and operable within one window and a second cursor displayed and operable in a second window.

The invention also provides for these general principles to be applied to other types of objects and applications, such as spreadsheet cells (involving data, formula objects, and cell formats), graphical objects, electronic CAD diagrams (where objects may be connected with formulas, dynamic models, etc.), and others as will be apparent to one skilled in the art.

3.10 Simulation, Processing, and Analysis Applications

Simulation, processing, and analysis applications typically involve a large number of parameters which are adjusted to model, affect or investigate the resulting behaviors, end results, and/or implications. Conventional 2-parameter user interface devices such as a mouse/trackball/touchpad require the user to adjust these parameters pairwise (or individually with a knob box as has been done historically in some systems) involving complex repetitive passes among high-overhead operations as depicted in FIGS. 9a-9b, for example among steps 901, 902, 903. As in the case of 3D object positioning and orientation, the division among high-overhead operations, for example moving among steps 901, 902, 903, can be functionally disruptive as well as slow and inefficient. The ability to interactively and freely adjust larger collections of parameters simultaneously is thus also of extremely high value.

3.11 Live Signal Processing and Lighting Applications

Figure 18A:
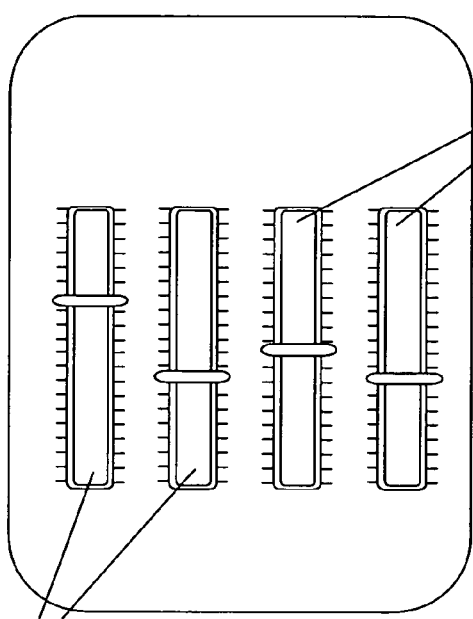
FIGS. 18a-18d show various control arrangements which may be configured with a mouse.

In artistic performance, composition, and recording applications, control of large numbers of parameters requiring simultaneous interactive adjustment is common. Conventional recording, mixing, video, and light control consoles typically have large numbers of controls with carefully designed spatial layouts to facilitate the rapid and precise adjustment of multiple parameters via knobs, sliders, pushbuttons, toggle switches, etc. The introduction of computer GUIs has added considerable value and new capabilities, including "soft" reconfigurable consoles and functional assignments, but in the bargain typically encumber users—accustomed to rapid and precise operation of multiple parameters—with a 2-parameter mouse/trackball/touchpad having the overhead of iterative context-switching operations depicted in FIGS. 8 and 9a-9b. As in the case of 3D object positioning and orientation, the division among high-overhead operations, for example moving among steps 901, 902, 903, can be functionally disruptive as well as slow and inefficient. The ability to interactively freely adjust larger collections of parameters simultaneously is thus also of extremely high value in artistic performance, composition, recording mixing, video, and light control applications. This is so much of an issue that new generations of generalized hardware "control surfaces" providing assignable sliders, switches, buttons, etc. have begun to appear (see for example "High-End Control Surfaces" by Rob Shrock, Electronic Musician, February 2002, pp. 72-80). In that various implementations of the present invention provide larger collections of simultaneously adjustable parameters, the invention provides a bridge between the traditional mouse and the more complicated and expensive "control surface" hardware technologies. The present invention may be further specialized to include special layouts of additional user interface sensors—for example, as shown in FIGS. 18a-18b the top surface of a mouse 1800a, 1800b may be outfitted with a number of finger operated sliders 1811, narrowly columnated touchpads 1812, or other types of controls pertaining to traditional contexts and layouts of control consoles in addition or as an alternative to the usual mouse buttons 1801, 1802.

Figure 18B:
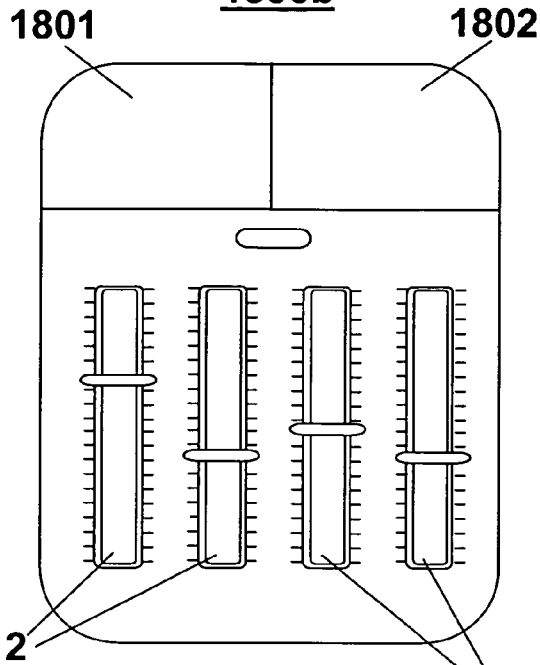
Figure 18C:
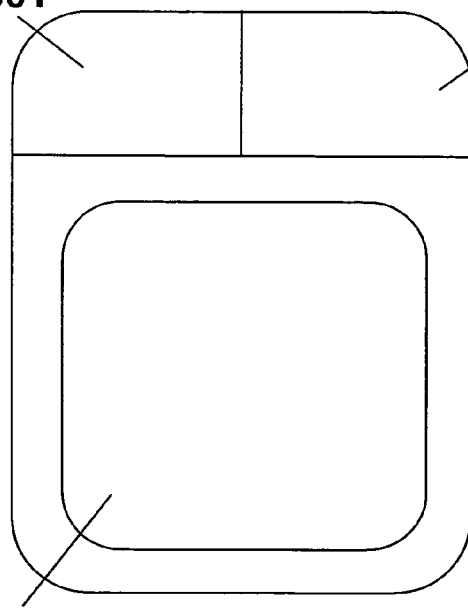
Figure 18D:
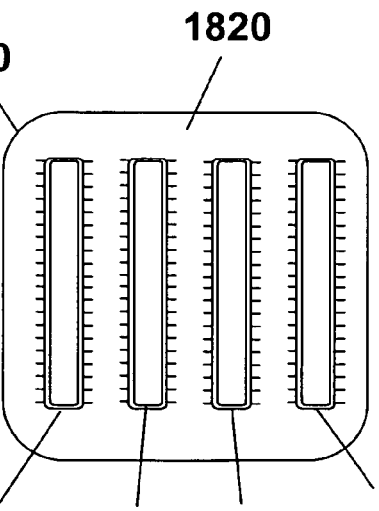

It is noted that, as shown in FIG. 18*c*, narrowly columnated touchpads for use with individual fingers, functionally equivalent to that of FIG. 18*b*, can be realized with a single touchpad 1805 (as with FIG. 3*a*-3*c*) that would be useful in more general settings; here it may be advantageous to add an overlay bezel 1820 with finger slots 1830 and graduation markings 1840 as shown in FIG. 18*d*. Such a touchpad would offer valuable utility if it separately sensed and resolved multiple points of contact and produced control data that could be subsequent processed to produce isolated control signals uniquely responsive to each finger slot area of the touchpad.

3.12 Real-Time Machine Control and Plant Operations

Similarly, real-time machine control and plant (manufacturing, chemical, energy, etc.) operations also traditionally involve controlling a significant number of parameters requiring simultaneous interactive adjustment. Conventional real-time machine control and plant. operation consoles typically have large numbers of controls with carefully designed spatial layouts to facilitate the rapid and precise adjustment of multiple parameters via knobs, sliders, pushbuttons, toggle switches, etc. The introduction of computer GUIs can add considerable value and new capabilities, including "soft" reconfigurable consoles and functional assignments, but in the bargain typically significantly encumber users—accustomed to rapid and precise operation of multiple parameters—with a 2-parameter mouse/trackball/touchpad having the overhead of iterative context-switching operations depicted in FIGS. 8 and 9*a*-9*b*. As in the case of 3D object positioning/orientation and artistic applications described earlier, the division among high-overhead operations, for example moving among steps 901, 902, 903, can be functionally disruptive as well as slow and inefficient. The ability to interactively freely adjust larger collections of parameters simultaneously is thus also of extremely high value.

A very few examples of this category of application where the invention may be useful include many forms of robotics control, computer-control manufacturing tools, industrial optical and electron microscopy, camera control (pan, tilt, zoom, focus, and/or iris), plant process elements (heaters, pumps, values, stirrers, aerators, actuators, activators, etc.), and a wide range of other related and divergent possibilities apparent to those skilled in the art.

3.13 Readily Available Zoom control

In complex drawings, layouts, and other visual-interface applications it is often necessary to zoom in and out many times to adjust details at various levels of scale. In many user interfaces and applications this involves extensive context switching overhead of the type depicted in FIGS. 8, 9*a*, and 9*b*. The additional interactively control parameters provided for by the invention may be used to eliminate this problem by removing this context switching between drawing/layout adjustment modes and zoom adjustment modes. This can be done in a number of ways.

In one exemplary implementation, the additional interactively control parameters provided by one user interface sensor provided for by the invention may be used to control the screen zoom of the displayed diagram, image, etc., allowing the remaining user interface sensor to be used for drawing/layout adjustment.

In another implementation, the application's displayed diagram, image, etc. may be simultaneously displayed in two scales, i.e., a macroscopic and microscopic views. In this implementation, one user interface sensor may be used to adjust aspects of the drawing in the macroscopic view with an adjustment resolution appropriate for that scale of rendering, while another user interface sensor may be used to adjust aspects of the drawing in the microscopic view with an adjustment resolution appropriate for that scale of rendering. Changes made at one scale are reflected in both the macroscopic and microscopic views. This is, in a way, similar to the multiple resolution capabilities described earlier, but here each of the user interfaces is uniquely directed towards one or the other of the macroscopic and microscopic views. The relative sizes of the macroscopic and microscopic views may be fixed or adjusted as relevant for the application or task as appropriate. It is also noted that a similar approach could be implemented with a conventional mouse by moving the cursor between the microscopic view window and the macroscopic view window.

3.14 Interactive Document Style Adjustment

In presentations, document layout, publishing layout, website design, and other applications style sheets, master pages, macros, etc. are used to set a uniform format and appearance of various aspects such as default font sizes, font styles, page margins, backgrounds, borders, indentations, list formats, paragraph formats, line widths, figure captions, figure borders, multi-column formats, etc. In many situations, details of these style sheets, master pages, macros, etc. may be in need of interactive adjustment as the project evolves. The additional interactively control parameters provided by one user interface sensor provided for by the invention may be used to control assignable details of these style sheets, master pages, macros, etc. for interactive adjustment leaving the other user interface free for traditional editing. In this way rapid interactive adjustment of both editing details and details of style sheets, master pages, macros, etc. can be freely interactively commingled without extensive context switching.

4. Concluding Remarks

The present invention at its core provides for a wide range of systems and methods for realizing and applying user interfaces providing, in many cases, at least four widely-variable simultaneously interactively adjustable parameters. In so doing, the invention more broadly encompasses novel user interface structures, metaphors, and applications readily suggested and enabled by the core of the invention but which may be indeed realized in ways not involving the core of the invention.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed with reference to the claims.

What is claimed is:

1. A user interface for controlling an external device, comprising:

a user-removable module containing first and second user interface sensors, said module sized to be received within a compartment configured with said external device, said first user interface sensor configured with said user-removable module and generating, only when said user-removable module is removed from said compartment, a first plurality of signals responsive to movement of said user-removable module relative to two orthogonal axes; and said second user interface sensor configured with said user-removable module and generating, regardless of whether or not said user-removable module is contained within said compartment, a second plurality of signals individually representing one of a plurality of different values responsive to user manipulation relative to two orthogonal axes; and a multiplex function providing an output signal responsive to signals generated by said first and second user interface sensors, wherein each of said first plurality of signals and second plurality of signals permit simultaneous control of respective first and second aspects of said external device, the first aspect being not controllable by any of the second plurality of signals, such that the output signal is received by a demultiplexer of an external device, the demultiplexer producing a plurality of first additional signals associated with the first plurality of signals, and a plurality of second additional signals corresponding to the second plurality of signals, and a photoelectric cell configured with said user-removable module and supplying electrical power to said first and second user interface sensors.

* * * * *